US009749782B2

(12) United States Patent
Jovicic et al.

(10) Patent No.: US 9,749,782 B2
(45) Date of Patent: Aug. 29, 2017

(54) LIGHT FIXTURE COMMISSIONING USING ENCODED LIGHT SIGNALS

(71) Applicant: QUALCOMM Incorporated, San Diego, CA (US)

(72) Inventors: Aleksandar Jovicic, Jersey City, NJ (US); Supreeth Achar, Pittsburgh, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/813,979

(22) Filed: Jul. 30, 2015

(65) Prior Publication Data

US 2016/0037293 A1   Feb. 4, 2016

Related U.S. Application Data

(60) Provisional application No. 62/031,641, filed on Jul. 31, 2014, provisional application No. 62/146,059, filed on Apr. 10, 2015.

(51) Int. Cl.
*H04B 10/00* (2013.01)
*H04W 4/02* (2009.01)
*H04B 10/116* (2013.01)
*G01C 21/20* (2006.01)

(52) U.S. Cl.
CPC ............ *H04W 4/02* (2013.01); *G01C 21/206* (2013.01); *H04B 10/116* (2013.01)

(58) Field of Classification Search
USPC ....................................................... 398/172
See application file for complete search history.

(56) References Cited

U.S. PATENT DOCUMENTS

| 6,954,591 | B2 * | 10/2005 | Lupton | H04B 10/116 398/106 |
| 7,970,537 | B2 * | 6/2011 | Ann | G01C 21/20 398/172 |
| 8,019,227 | B2 * | 9/2011 | Iizuka | H04B 10/1125 382/103 |
| 8,233,806 | B2 * | 7/2012 | Kitaji | H04B 10/1149 398/118 |
| 8,334,901 | B1 * | 12/2012 | Ganick | G01S 1/70 348/131 |

(Continued)

FOREIGN PATENT DOCUMENTS

WO   WO 2009139796 A1   11/2009

OTHER PUBLICATIONS

ISA/EPO, International Search Report and Written Opinion of the International Searching Authority, Int'l. App. No. PCT/US2015/043259, Apr. 4, 2016, European Patent Office, Rijswijk, NL, 17 pgs.

(Continued)

*Primary Examiner* — Agustin Bello
(74) *Attorney, Agent, or Firm* — Holland & Hart LLP

(57) ABSTRACT

Methods, systems, and devices are described for commissioning light fixtures. One method may include receiving, at a mobile device, an encoded light signal from a light fixture in a plurality of light fixtures. The encoded light signal may be decoded to obtain an identifier associated with the light fixture, and a correspondence between the identifier and a plurality of locations of the plurality of light fixtures may be determined.

20 Claims, 21 Drawing Sheets

(56) References Cited

U.S. PATENT DOCUMENTS

| | | | |
|---|---|---|---|
| 8,432,438 B2 * | 4/2013 | Ryan | H05B 37/0272 332/109 |
| 8,436,896 B2 * | 5/2013 | Staats | G01S 1/70 348/61 |
| 8,457,502 B2 * | 6/2013 | Ryan | G01S 1/70 398/172 |
| 8,531,134 B2 | 9/2013 | Chemel et al. | |
| 8,620,163 B1 * | 12/2013 | Sleator | H04B 10/116 348/116 |
| 8,886,045 B2 * | 11/2014 | Pederson | H04B 10/1143 315/312 |
| 8,928,232 B2 | 1/2015 | Aggarwal et al. | |
| 8,934,784 B2 * | 1/2015 | Guo | H04B 10/116 398/172 |
| 8,942,570 B2 * | 1/2015 | Schenk | H05B 37/029 382/312 |
| 9,037,001 B2 * | 5/2015 | Jovicic | H04B 10/116 398/118 |
| 9,324,091 B2 * | 4/2016 | Randell | H04W 4/206 |
| 2007/0288197 A1 | 12/2007 | Martin | |
| 2009/0171571 A1 * | 7/2009 | Son | G01C 21/20 701/532 |
| 2009/0269073 A1 | 10/2009 | Kitaji | |
| 2011/0010090 A1 * | 1/2011 | Bae | G01C 21/00 701/532 |
| 2013/0026940 A1 | 1/2013 | Ganick et al. | |
| 2013/0028612 A1 * | 1/2013 | Ryan | G01S 1/70 398/172 |
| 2013/0141554 A1 * | 6/2013 | Ganick | G01S 1/70 348/61 |
| 2013/0272717 A1 * | 10/2013 | Deguchi | H04B 10/116 398/154 |
| 2014/0045549 A1 | 2/2014 | Ryan et al. | |
| 2014/0086590 A1 * | 3/2014 | Ganick | G06Q 30/02 398/118 |
| 2014/0191682 A1 | 7/2014 | Pederson | |
| 2014/0193162 A1 * | 7/2014 | Iizuka | H04B 10/1129 398/172 |
| 2014/0199082 A1 * | 7/2014 | Iizuka | H04B 10/116 398/172 |
| 2014/0280316 A1 * | 9/2014 | Ganick | G06F 17/30522 707/769 |
| 2014/0375982 A1 * | 12/2014 | Jovicic | G01B 11/14 356/72 |
| 2015/0002292 A1 * | 1/2015 | Cavalcanti | G08B 21/0211 340/539.12 |
| 2015/0147067 A1 * | 5/2015 | Ryan | H04B 10/25752 398/118 |
| 2015/0372753 A1 * | 12/2015 | Jovicic | H04B 10/116 398/172 |
| 2015/0373503 A1 * | 12/2015 | Jovicic | G01S 5/0252 455/456.1 |
| 2016/0036526 A1 * | 2/2016 | Parello | H04B 10/1149 398/127 |
| 2016/0037293 A1 * | 2/2016 | Jovicic | H04W 4/02 398/118 |
| 2016/0061396 A1 * | 3/2016 | Bosua | G08C 23/04 362/231 |
| 2016/0081155 A1 * | 3/2016 | Campbell | H05B 37/02 315/151 |
| 2016/0191158 A1 * | 6/2016 | Aoyama | H04B 10/1149 398/172 |
| 2016/0191159 A1 * | 6/2016 | Aoyama | H04N 21/436 398/172 |
| 2016/0197675 A1 * | 7/2016 | Ganick | H04N 5/225 398/172 |

OTHER PUBLICATIONS

ISA/EPO, Partial International Search Report of the International Searching Authority, Int'l. App. No. PCT/US2015/043259, Nov. 24, 2015, European Patent Office, Rijswijk, NL, 6 pgs.

* cited by examiner

LIGHT FIXTURE COMMISSIONING USING ENCODED LIGHT SIGNALS

CROSS REFERENCES

The present Application for Patent claims the benefit of U.S. Provisional Patent Application No. 62/031,641, by Jovicic et al., entitled "Light Fixture Commissioning Using Visible Light Communication," filed Jul. 31, 2014, and U.S. Provisional Patent Application No. 62/146,059, by Jovicic et al., entitled "Light Fixture Commissioning Using Visible Light Communication," filed Apr. 10, 2015, each of which is assigned to the assignee hereof, and each of which is expressly incorporated by reference herein.

BACKGROUND

As the light emission efficiency of the light emitting diode (LED) is improved and the cost thereof decreases, the LED has become common in general lighting applications for residential, commercial, outdoor, and industrial market segments. The LED has also become common in special lighting applications such as lighting applications in portable devices, display devices, vehicles, sign lamps, signboards, etc. By encoding (e.g., modulating or otherwise affecting operation of) one more LEDs in a light fixture, it is possible to transmit information via the generated light signal in a manner which may not be perceived by a person but which may be detected by an electronic device, e.g., having a photo detector or array of photo detectors (e.g., a CMOS image sensor and/or rolling shutter image sensor of a camera)).

Encoded light signals transmitted by such and other like light fixtures may, for example, be used for mobile device functions such as positioning, orienting, navigating, etc. To perform certain functions, it may be useful for a mobile device to make use of some physical correspondence between the locations of a set of identifiable light fixtures (e.g., identified by their encoded light signals). Unfortunately, in certain instances, a correspondence between light fixtures within an environment may be unknown to the mobile device.

SUMMARY

In some aspects, the described features generally relate to one or more methods and/or apparatus for use in light fixture commissioning, e.g., for one or more light fixtures, determining a correspondence between some form of light fixture information (e.g., an identifier) and the light fixture's location, using their respective encoded light signals. More particularly, the methods and/or apparatus enable a mobile device to perform light fixture commissioning based, at least in part, on encoded light signals received from one or more light fixtures. In one set of embodiments, light fixture commissioning may be performed automatically, by a mobile device, using time-stamped identifiers of light fixtures obtained from encoded light signals received at the mobile device, and from time-stamped sensor measurements acquired at the mobile device. The time-stamped sensor measurements may in some cases include directions-of-arrival of the received encoded light signals. The time-stamped sensor measurements may be used to determine a sequence of time-stamped locations of the mobile device with respect to a plurality of locations of a plurality of light fixtures (e.g., as the mobile device is moved under the plurality of light fixtures).

A correspondence between the time-stamped identifiers and the plurality of locations of the plurality of light fixtures may be determined by correlating the time-stamped identifiers with the time-stamped locations of the mobile device, which locations of the mobile device may have a reference that is known or determined with respect to the plurality of locations of the plurality of light fixtures. In another set of embodiments, light fixture commissioning may be performed semi-automatically or manually at a mobile device. In these latter embodiments, the mobile device may obtain identifiers of light fixtures from encoded light signals received at the mobile device and provide an interface via which the locations of light fixtures corresponding to the identifiers may be input or selected (e.g., from a displayed map of light fixture locations). In either set of light fixture commissioning embodiments, some or all of the locations of the plurality of light fixtures may in some cases be determined by the mobile device based on directions-of-arrival of the encoded light signals received at the mobile device and/or based on other information.

In a first set of illustrative examples, a method for mapping light fixtures is described. In one configuration, the method may include receiving, at a mobile device, an encoded light signal from a light fixture in a plurality of light fixtures. The encoded light signal may be decoded to obtain an identifier associated with the light fixture, and a correspondence between the identifier and a plurality of locations of the mobile device with respect to a location of each light fixture of the plurality of light fixtures may be determined.

In some examples, the method may include time-stamping the identifier, and determining a sequence of time-stamped locations of the mobile device with respect to the locations of each light fixture of the plurality of light fixtures. In some examples of the method, determining the correspondence between the identifier and the plurality of locations may include correlating the time-stamped identifier with the time-stamped locations of the mobile device. In some examples, the method may include acquiring time-stamped sensor measurements at the mobile device, and processing at least some of the time-stamped sensor measurements using a probability function to determine the sequence of time-stamped locations of the mobile device.

In some examples of the method, acquiring time-stamped sensor measurements may include acquiring camera measurements. The camera measurements may include a direction-of-arrival of at least the encoded signal received from the light fixture. In some examples, the method may include determining a location of the light fixture based at least in part on the direction-of-arrival of the encoded signal received from the light fixture and based at least in part on the sequence of time-stamped locations of the mobile device. In some examples, the method may include determining locations of at least two light fixtures in the plurality of light fixtures based at least in part on directions-of-arrival of encoded signals received from the at least two light fixtures and based at least in part on the sequence of time-stamped locations of the mobile device. In some examples, the method may include receiving, at the mobile device, at least one additional encoded signal from at least one additional light fixture in the plurality of light fixtures; decoding the at least one additional encoded signal to obtain at least one additional identifier associated with the at least one additional light fixture; time-stamping each of the at least one additional identifier; and determining a correspondence between at least two identifiers having a common time-stamp and the plurality of locations of the mobile device with respect to the location of each light fixture of the plurality of light fixtures based at least in part on directions-of-arrival of the encoded light signals from which the at least two identifiers having the common time-stamp are decoded.

In some examples of the method, processing the time-stamped sensor measurements using the probability function may include processing the time-stamped sensor measurements using a Bayesian interference model. In some examples of the method, acquiring the time-stamped sensor measurements may include acquiring at least one of camera measurements, inertial measurements, magnetic measurements, radio measurements, or a combination thereof.

In some examples of the method, determining the sequence of time-stamped locations of the mobile device may include estimating at least one movement of the mobile device, and determining at least a second of the time-stamped locations in relation to at least a first of the time-stamped locations and the estimated movement of the mobile device. In some examples, the method may include determining at least a first of the time-stamped locations based at least in part on a location of an external reference.

In some examples, the method may include receiving input identifying a location of the light fixture associated with the identifier. In some examples, the method may include displaying information corresponding to a number of light fixtures that includes the plurality of light fixtures, and receiving a selection from the information corresponding to the number of light fixtures. In some examples of the method, displaying the information may include displaying a map of the number of light fixtures. In some examples of the method, receiving the encoded light signal at the mobile device may include receiving the encoded signal using a rolling shutter image sensor of the mobile device.

In a second set of illustrative examples, a mobile device for mapping light fixtures is described. In one configuration, the mobile device may include means for receiving an encoded light signal from a light fixture in a plurality of light fixtures, means for decoding the encoded signal to obtain an identifier associated with the light fixture, and means for determining a correspondence between the identifier and a plurality of locations of the plurality of light fixtures. In some examples, the apparatus may further include means for implementing one or more aspects of the method for wireless communication described above with respect to the first set of illustrative examples.

In a third set of illustrative examples, another mobile device for mapping light fixtures is described. In one configuration, the mobile device may include a processor, memory in electronic communication with the processor, and instructions stored in the memory. The instructions may be executable by the processor to receive an encoded signal from a light fixture in a plurality of light fixtures, decode the encoded signal to obtain an identifier associated with the light fixture, and determine a correspondence between the identifier and a plurality of locations of the plurality of light fixtures. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for mapping light fixtures is described. In one configuration, the code may be executable by a processor to receive an encoded light signal from a light fixture in a plurality of light fixtures, decode the encoded signal to obtain an identifier associated with the light fixture, and determine a correspondence between the identifier and a plurality of locations of the plurality of light fixtures. In some examples, the code may also be executable by the processor to implement one or more aspects of the method for wireless communication described above with respect to the first set of illustrative examples.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present description may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
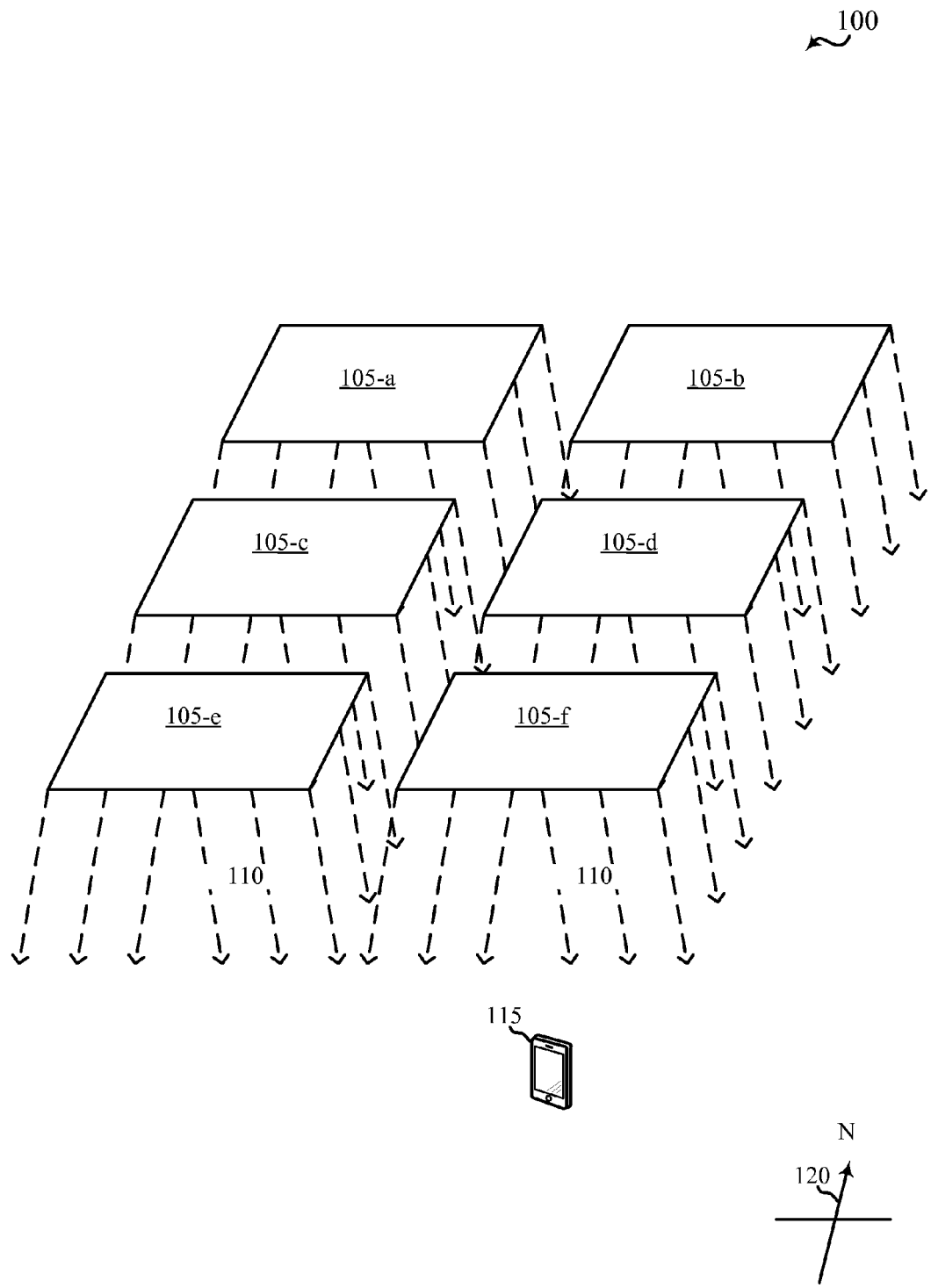
FIG. 1 is a diagram of an example of a mobile device positioned below a number of light fixtures, in accordance with certain example implementations.

Several techniques for use in light fixture commissioning using encoded light signals are described by way of example herein. An encoded light signal may, for example, comprise one or more detectable characteristics (e.g., frequency, intensity, phase, on/off, etc.), patterns (e.g., based on some encoding scheme that nay modulate or otherwise affect one or more characteristics), and/or the like or some combination thereof just to name a few examples, and which may convey some form of information in-whole or in-part from the light fixture to an observing device. In one set of embodiments, light fixture commissioning may be performed (possibly automatically) by a mobile device, for example, using time-stamped identifiers of light fixtures obtained from encoded signals received at the mobile device, and from time-stamped sensor measurements acquired at the mobile device. The time-stamped sensor measurements may in some cases include directions-of-arrival of the received encoded signals. The time-stamped sensor measurements may be used to determine a sequence of time-stamped locations of the mobile device with respect to a location of each of a plurality of light fixtures (e.g., as the mobile device is moved under the plurality of light fixtures). In certain instances, a time-stamp may be applied by a sensor, or by another circuit coupled to the sensor, such as, e.g., a processor, memory, etc. A correspondence between the time-stamped identifiers and the locations of each of the plurality of light fixtures may be determined by correlating the time-stamped identifiers with the time-stamped locations of the mobile device, which locations of the mobile device may have a reference that is known or determined with respect to the plurality of locations of the plurality of light fixtures. In another set of embodiments, light fixture commissioning, which may also be referred to as mapping, may be performed semi-automatically or manually at a mobile device. In these latter embodiments, for example, a mobile device may obtain identifiers of light fixtures from encoded signals received at the mobile device and provide or otherwise make use of an interface or the like (e.g., at the mobile device, at some other device, or both) via which all or part of one or more of the locations or other information of interest of one or more of the light fixtures corresponding to the identifiers may be input, selected (e.g., from a displayed map of light fixture locations), changed, or otherwise manipulated in some manner, just to name a few examples. In some embodiments, some or all of the locations of each of the plurality of light fixtures may in some cases be determined by the mobile device based on directions-of-arrival of the encoded signals received at the mobile device and/or based on other information.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring now to FIG. 1, a diagram 100 illustrates an example of a mobile device 115 positioned below a number of light fixtures 105-*a*, 105-*b*, 105-*c*, 105-*d*, 105-*e*, and 105-*f* having an orientation 120.

In some examples, each of the light fixtures 105 may include a driver circuit and one or more light emitting elements. The light emitting elements may include one or more light emitting elements that provide ambient illumination 110, and one or more light emitting elements (e.g., one or more light emitting diodes (LEDs)) that may be used to transmit an encoded light signal in which an identifier of the light fixture is encoded. In some examples, VLC may be an example of communication using encoded light signals. In some cases, the one or more light emitting elements that are used to transmit the encoded signal may be the same one or more light emitting element that provides all or part of the ambient illumination 110.

The light fixtures 105-*a*, 105-*b*, 105-*c*, 105-*d*, 105-*e*, and 105-*f* may in some examples be overhead light fixtures in a building, which overhead light fixtures may have fixed locations with respect to a reference (e.g., a global positioning system (GPS) coordinate system and/or building floor plan). In some cases, the light fixtures 105-*a*, 105-*b*, 105-*c*, 105-*d*, 105-*e*, and 105-*f* may also have fixed orientations with respect to a reference (e.g., a meridian passing through magnetic north 125). While the term "fixture" is used herein to refer to a light emitting device, it should be understood that such a device need not necessarily be "fixed" for all time in one place (at one location). Thus, in certain implementations, such devices may be "permanently" fixed in place (e.g., affixed to an overhead beam, etc.), or may be "temporarily" fixed in place (e.g., sitting on a platform, shelf, hung from a crane, etc.). Indeed, one of skill in the art may adapt the example techniques herein for use with devices that may undergo some form of movement (e.g., provisioned as part of a retractable/movable roof, a modular structure, etc.).

In some examples, the mobile device 115 may be a mobile phone or tablet computer. The mobile device 115 may include a photo detector or array of photo detectors (e.g., an image sensor) for receiving the encoded signals transmitted by the light fixtures 105 as the mobile device 115 is moved near and/or under the light fixtures 105. In some embodiments, the mobile device 115 may be able to communicate over one or more access networks, such as one or more wireless local area network (WLANs) and/or one or more wireless wide area networks (WWANs). The mobile device 115 may communicate over the one or more access networks with, for example, a server, a light fixture controller, a building automation system, and/or the light fixtures 105.

As the mobile device 115 moves (or is moved) under one or more of the light fixtures 105-a, 105-b, 105-c, 105-d, 105-e, and 105-f, the image sensor of the mobile device 115 may receive light emitted by one or more of the light fixtures 105-a, 105-b, 105-c, 105-d, 105-e, and 105-f and capture an image of part or all of one or more of the light fixtures 105-a, 105-b, 105-c, 105-d, 105-e, and 105-f. The captured image may include one or more illuminated light fixture features, such as corners and/or centroids of the light fixtures 105, and/or stickers and/or other indicia illuminated by the light fixtures 105. Alternatively or additionally, the mobile device 115 may receive, from one or more of the light fixtures 105-a, 105-b, 105-c, 105-d, 105-e, and 105-f, encoded signals in which identifiers of the light fixtures 105-a, 105-b, 105-c, 105-d, 105-e, and 105-f are encoded. The received identifier(s) may be used by the mobile device 115 for light fixture commissioning. After light fixture commissioning, the received identifier(s) may be used by the mobile device 115 and/or other devices for purposes such as determining a location of the mobile device 115, orienting the mobile device 115, and/or navigating the mobile device with reference to a GPS coordinate system and/or building floor plan (or map).

Figure 2:
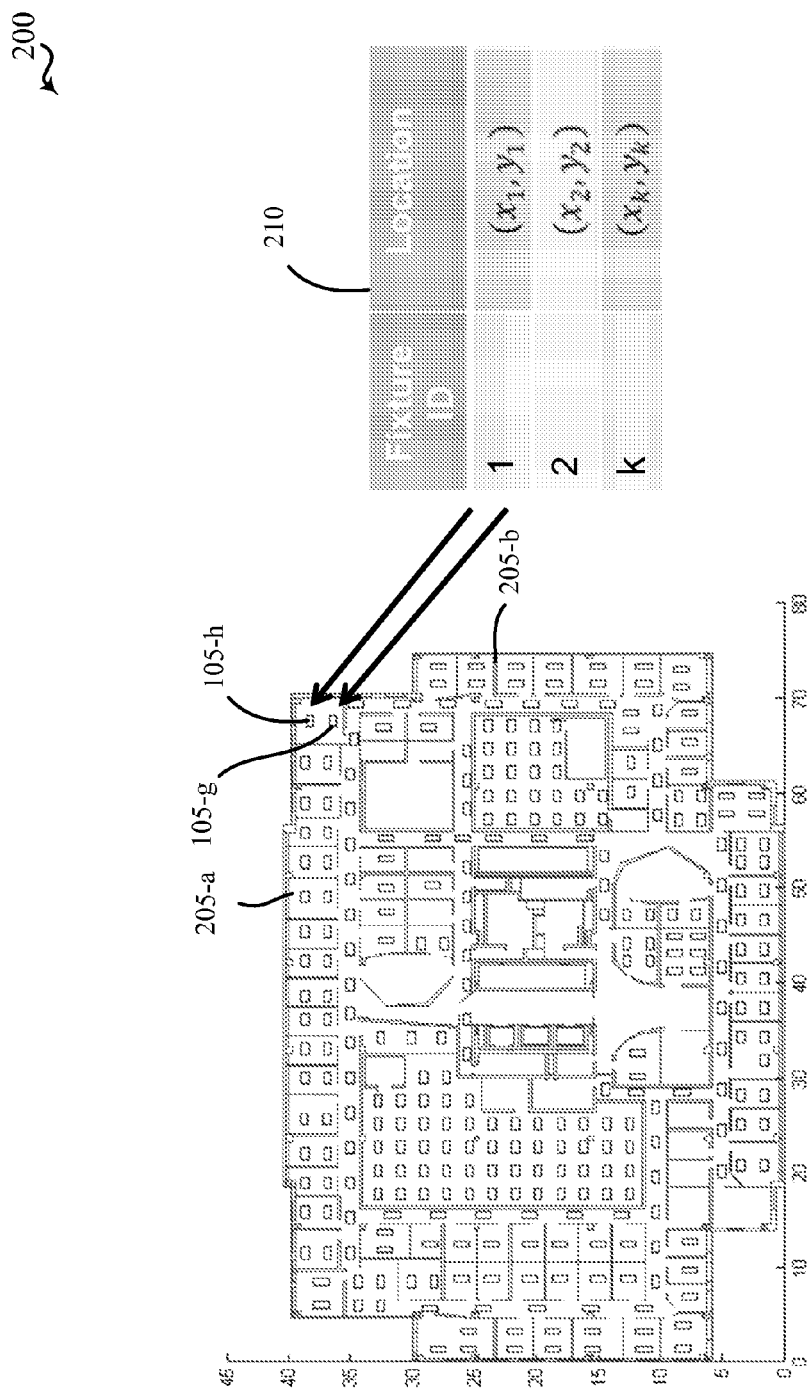
FIG. 2 illustrates an example map of a number of light fixtures, in accordance with certain example implementations.

FIG. 2 illustrates an example map 200 of a number of light fixtures (e.g., light fixtures 105-g, 105-h) arranged within an indoor environment. In some examples, the light fixtures 105-g, 105-h may be examples of aspects of the light fixtures 105 described with reference to FIG. 1. By way of example, the map illustrates locations of the light fixtures 105-g, 105-h within a venue (e.g., on a building floor), and illustrates the locations of walls 205-a, 205-b and other features, which may include wall-mounted fixtures (e.g., sconces), with respect to the locations of the light fixtures 105-g, 105-h. In some cases, the locations of the light fixtures 105-g, 105-h may be indicated in coordinate form (e.g., x-y coordinates, such as $(x_1, y_1)$, $(x_2, y_2)$, and/or $(x_k, y_k)$), as depicted in table 210.

During the performance of light fixture commissioning (e.g., mapping) using a mobile device, as described herein, a correspondence between identifiers of the light fixtures 105-g, 105-h and locations of the light fixtures 105-g, 105-h may be determined and saved by the mobile device. The correspondence may in some cases be saved in a database file and transmitted to one or more other devices, such as a remote server, light fixture controller, and/or building automation system, over an access network (e.g., a wireless local area network (WLAN) and/or wireless wide area network (WWAN)) to which the mobile device can connect.

Figure 3:
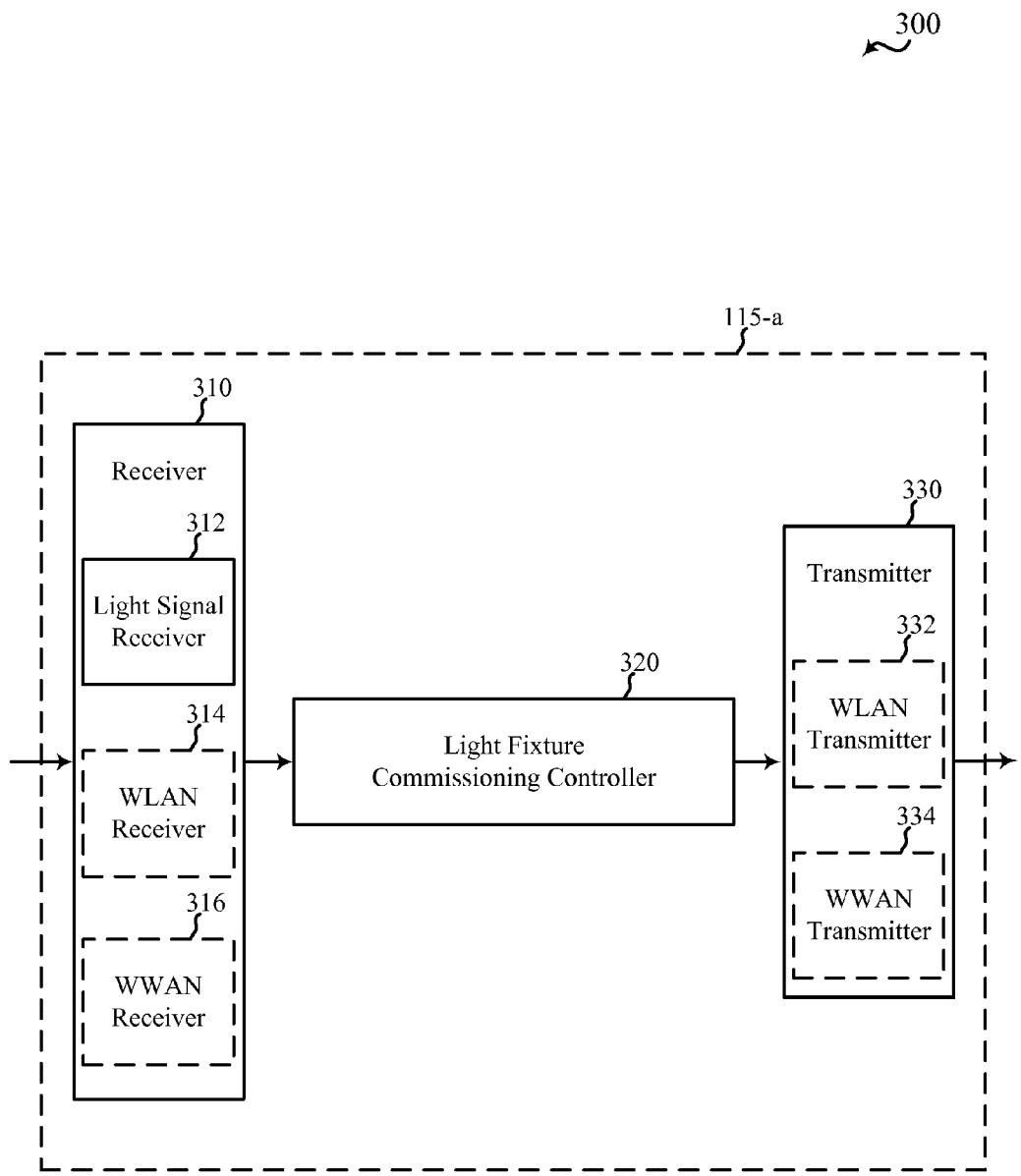
FIG. 3 is a block diagram of an example of a mobile device for commissioning light fixtures, in accordance with certain example implementations.

Referring now to FIG. 3, a block diagram 300 illustrates an example of a mobile device 115-a for commissioning light fixtures. In some examples, the light fixtures may be examples of the light fixtures 105 described with reference to FIG. 1 and/or 2. The mobile device 115-a may be an example of aspects of the mobile device 115 described with reference to FIG. 1. The mobile device 115-a may, in some cases, be or include a processor. The mobile device 115-a may include a receiver 310, a light fixture commissioning controller 320, and/or a transmitter 330. Each of these components may be in communication with each other.

The components of the mobile device 115-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver 310 may include a light signal receiver 312. The light signal receiver 312 may be used to receive encoded light signals from light fixtures. The light signal receiver 312 may decode the signals to obtain identifiers of the light fixtures. In some examples, the light signal receiver 312 may be part of a photo detector or array of photo detectors (e.g., part of a complimentary metal-oxide semiconductor (CMOS) image sensor and/or rolling shutter image sensor of a camera). In some embodiments, the light signal receiver 312 may receive an encoded light signal across a plurality of image frames. The receiver 310 may also include alternate and/or additional receivers, such as one or more radio frequency (RF) receivers (e.g., a wireless local area network (WLAN) receiver 314 (e.g., a Wi-Fi receiver), a wireless wide area network (WWAN) receiver 316 (e.g., a cellular receiver such as an LTE/LTE-A receiver), a Bluetooth (BT) receiver, and/or a BT Low Energy (BTLE) receiver). An RF receiver may be used to receive, for example, various types of data and/or control signals (i.e., transmissions) over one or more communication links of a wireless communication system. In some examples, an RF receiver may be used to receive (e.g., from a server and/or building automation system) a database and/or map of a plurality of locations of a plurality of light fixtures (e.g., a map of the locations of light fixtures in a building or on a building floor).

In some examples, the transmitter 330 may include one or more RF transmitters (e.g., a WLAN transmitter 332 such as a Wi-Fi transmitter), a WWAN transmitter 334 (e.g., a cellular transmitter such as an LTE/LTE-A transmitter), a BT transmitter, and/or a BTLE transmitter). A WLAN transmitter 332, WWAN transmitter 334, BT transmitter, and/or BTLE transmitter may be used to transmit, for example, various types of data and/or control signals (i.e., transmissions) over one or more communication links of a wireless communication system. In some examples, an RF transmitter may be used to transmit (e.g., to a server and/or building automation system) a database indicating a correspondence between identifiers of light fixtures and locations of light fixtures.

The light fixture commissioning controller 320 may be used to manage various functions related to light fixture commissioning. The light fixture commissioning controller 320 may be used to commission or map one or more light fixtures automatically (e.g., without user input), semi-automatically (e.g., based partly on user input), and/or manually (e.g., based on user input). Light fixture commissioning may involve determining a correspondence between identifiers of light fixtures (e.g., identifiers of light fixtures encoded in encoded light signals received from the light fixtures via the light signal receiver 312) and locations of the light fixtures. The locations of some or all of the light fixtures may be obtained from a database stored locally on (or remotely from) the mobile device 115-a. The locations of some or all of the light fixtures may also or alternatively be determined by the light fixture commissioning controller 320 (e.g., from encoded signals, sensor measurements, etc.).

In some embodiments, the light fixture commissioning controller 320 may transmit a database file of identifiers and corresponding light fixture locations to a remote server, light fixture controller, and/or building automation system. In some cases, the database file may be locally stored on the mobile device 115-a until requested by the remote server, light fixture controller, and/or building automation system. In some cases, the database file may be transmitted over a WLAN and/or WWAN. The database file may be used by the mobile device 115-a and/or other devices to determine the device's position and/or orientation, and/or to navigate within a building. The database file may be used by a light fixture controller and/or building automation system to adjust the dimming level, on/off state, color, etc. of light fixtures having selected locations (e.g., in selected rooms or halls). A light fixture controller and/or building automation system may also be used, for example, to update/change the identifier associated with a light fixture (e.g., an identifier may be changed over time for security purposes, such as to ensure that the identifier of a light fixture cannot be sniffed and/or spoofed).

Figure 4:
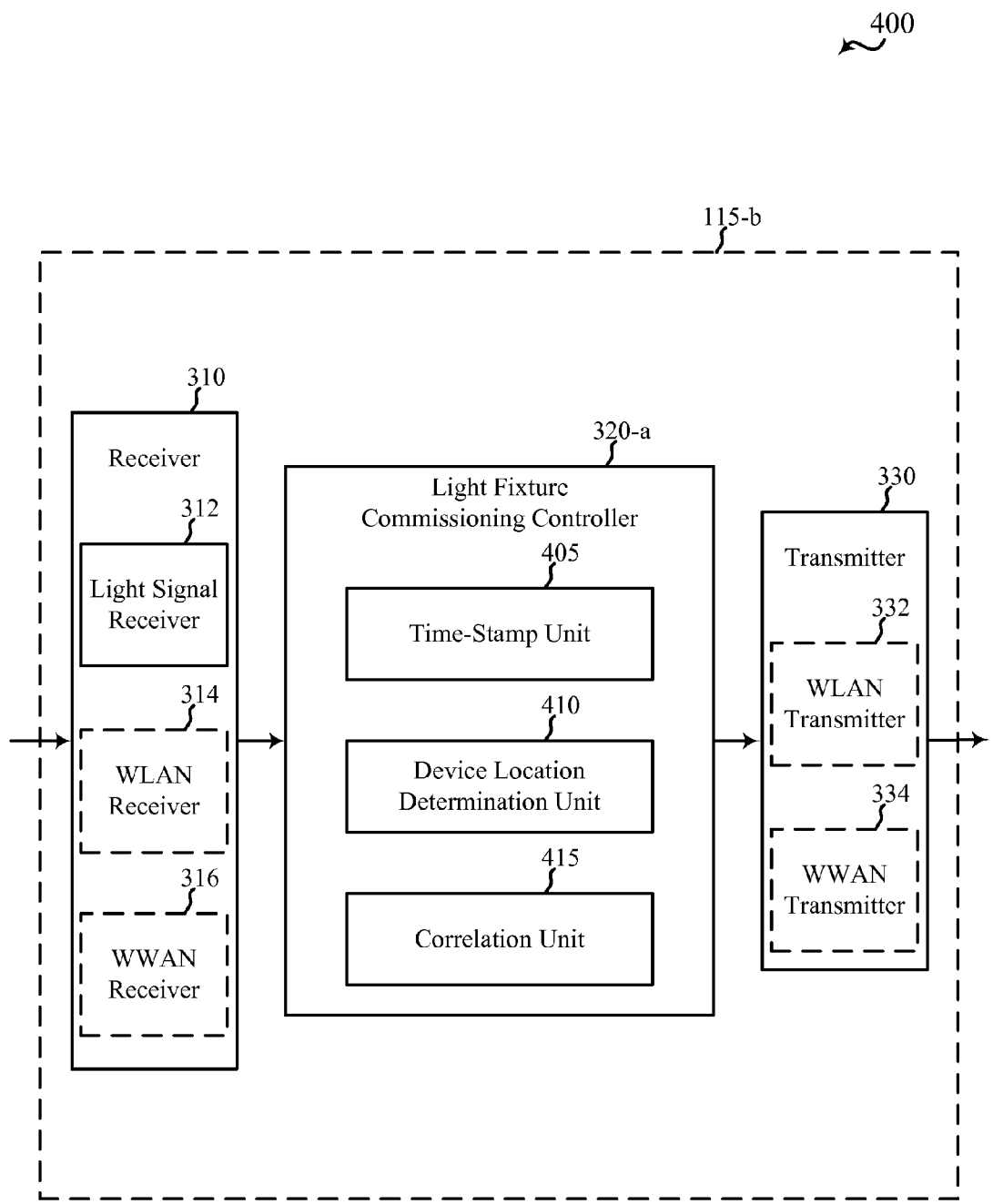
FIG. 4 is a block diagram of another example of a mobile device for commissioning light fixtures, in accordance with certain example implementations.

Referring now to FIG. 4, a block diagram 400 illustrates an example of a mobile device 115-b for commissioning light fixtures. In some examples, the light fixtures may be examples of the light fixtures 105 described with reference to FIG. 1 and/or 2. The mobile device 115-b may be an example of aspects of one or more of the mobile devices 115 described with reference to FIG. 1 and/or 3. The mobile device 115-b may in some cases be a processor. The mobile device 115-b may include a receiver 310, a light fixture commissioning controller 320-a, and/or a transmitter 330. Each of these components may be in communication with each other.

The components of the mobile device 115-b may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 310 may include a light signal receiver 312, a WLAN receiver 314, and/or a WWAN receiver 316, and the transmitter 330 may include a WLAN transmitter 332 and/or a WWAN transmitter 334. In some embodiments, the receiver 310 and transmitter 330, and portions thereof, may be configured as described with reference to FIG. 3. In some embodiments, the light signal receiver 312 may receive encoded light signals from one or more of a plurality of light fixtures (e.g., from one of the light fixtures 105 described with reference to FIG. 1 and/or 2) and decode each light signal to obtain an identifier of a light fixture. In some embodiments, the light signal receiver 312 may receive an encoded light signal across a plurality of image frames. In some examples, VLC may be an example of communicating by encoded light signals.

The light fixture commissioning controller 320-a may be used to manage various functions related to light fixture commissioning and may include a time-stamp unit 405, a device location determination unit 410, and/or a correlation unit 415. Each of these components may be in communication with each other.

In some embodiments, the time-stamp unit 405 may be used to time-stamp each identifier decoded by the light signal receiver 312. The time-stamp unit 405 may be used to time-stamp recorded sensor observations with a time at which the corresponding light signal was received. In some cases, the time-stamp unit 405 may be used to time stamp each identifier corresponding to each light fixture with a time at which the corresponding light signal was received.

In some embodiments, the device location determination unit 410 may be used to determine a sequence of time-stamped locations of the mobile device 115-b with respect to a plurality of locations of a plurality of light fixtures. The locations of some or all of the light fixtures may be obtained from a database stored locally on (or remotely from) the mobile device 115-b. The locations of some or all of the light fixtures may also or alternatively be determined by the light fixture commissioning controller 320-a (e.g., from encoded light signals, sensor measurements, etc.). In some cases, at least a first of the time-stamped locations may be determined based at least in part on a location of an external reference (e.g., a location of a wall, one of the light fixtures, a Wi-Fi access point, etc.).

In some embodiments, the correlation unit 415 may be used to determine a correspondence between an identifier of a light fixture and a plurality of locations of light fixtures by correlating the time-stamped identifier with the time-stamped locations of the mobile device.

In some embodiments, part or all of the functionality of the device location determination unit 410 and/or the correlation unit 415 may be offloaded from the mobile device 115-b to a remote server and/or building automation system.

In some embodiments, the light fixture commissioning controller 320-a may transmit a database file of identifiers and corresponding light fixture locations to a remote server, light fixture controller, and/or building automation system. In some cases, the database file may be locally stored on the mobile device 115-b until requested by the remote server, light fixture controller, and/or building automation system. In some cases, the database file may be transmitted over a WLAN and/or WWAN. The database file may be used by the mobile device 115-b and/or other devices to determine the device's position and/or orientation, and/or to navigate within a building. The database file may be used by a light fixture controller and/or building automation system to adjust the dimming level, on/off state, color, etc. of light fixtures having selected locations (e.g., in selected rooms or halls). A light fixture controller and/or building automation system may also be used, for example, to update/change the identifier associated with a light fixture (e.g., an identifier may be changed over time for security purposes, such as to ensure that the identifier of a light fixture cannot be sniffed and/or spoofed).

Figure 5:
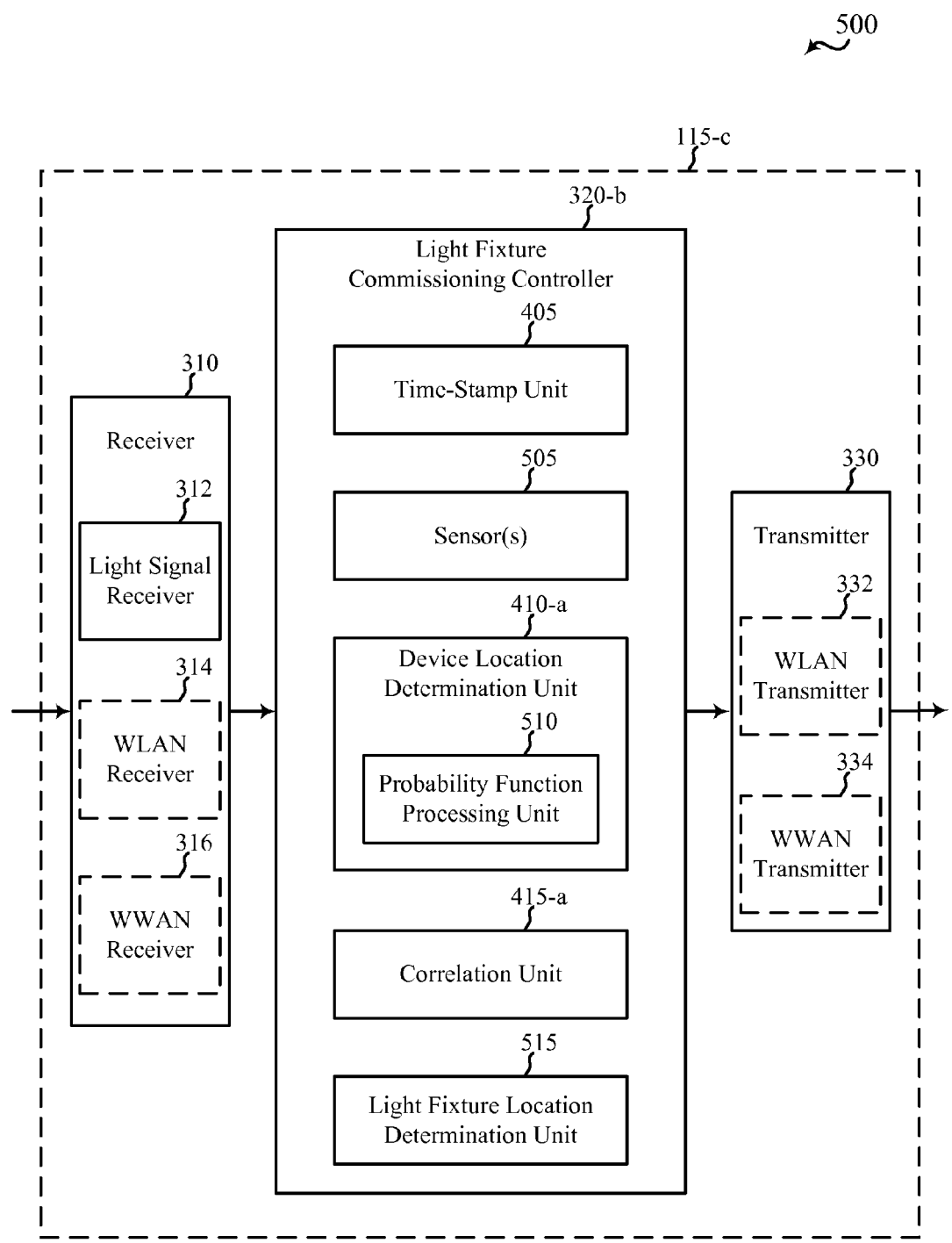
FIG. 5 is a block diagram of another example of a mobile device for commissioning light fixtures, in accordance with certain example implementations.

Referring now to FIG. 5, a block diagram 500 illustrates an example of a mobile device 115-c for commissioning light fixtures. In some examples, the light fixtures may be examples of the light fixtures 105 described with reference to FIG. 1 and/or 2. The mobile device 115-c may be an example of aspects of one or more of the mobile devices 115 described with reference to FIG. 1, 3, and/or 4. The mobile device 115-c may in some cases be a processor. The mobile device 115-c may include a receiver 310, a light fixture commissioning controller 320-b, and/or a transmitter 330. Each of these components may be in communication with each other.

The components of the mobile device 115-c may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 310 may include a light signal receiver 312, a WLAN receiver 314, and/or a WWAN receiver 316, and the transmitter 330 may include a WLAN transmitter 332 and/or a WWAN transmitter 334. In some embodiments, the receiver 310 and transmitter 330, and portions thereof, may be configured as described with reference to FIG. 3. In some embodiments, the light signal receiver 312 may receive encoded light signals from one or more of a plurality of light fixtures (e.g., from one of the light fixtures 105 described with reference to FIG. 1 and/or 2) and decode each light signal to obtain an identifier of a light fixture. In some embodiments, the light signal receiver 312 may receive an encoded light signal across a plurality of image frames.

The light fixture commissioning controller 320-v may be used to manage various functions related to light fixture commissioning and may include a time-stamp unit 405, one or more sensor(s) 505, a device location determination unit 410-a, a correlation unit 415-a, and/or a light fixture location determination unit 515. Each of these components may be in communication with each other.

In some embodiments, the time-stamp unit 405 may be used to time-stamp each identifier decoded by the light signal receiver 312.

In some embodiments, the sensor(s) 505 may include at least one of a camera sensor, an inertial sensor (e.g., a gyroscope and/or accelerometer), a magnetometer, and/or an RF sensor. When included, the camera sensor may in some cases provide the functionality of the light signal receiver 312. When included, the RF sensor may in some cases be a part of the WLAN receiver 314 and/or the WWAN receiver 316. The sensor(s) 505 may acquire time-stamped sensor measurements at the mobile device 115-c. In some examples, the time-stamped sensor measurements may include at least one of camera measurements, inertial measurements (e.g., gyroscope and/or accelerometer measurements), magnetic measurements, radio measurements (e.g., Wi-Fi signaling measurements such as a received signal strength indicator (RSSI) and/or WWAN signaling measurements such as a committed information rate (CIR)), or a combination thereof. Camera measurements may in some cases include directions-of-arrival of the encoded light signals. In some cases, the sensor(s) 505, e.g., in combination with a memory or processor, may record various sensor observations associated with the mobile device 115-c In some embodiments, the device location determination unit 410-a may be used to determine a sequence of time-stamped locations of the mobile device 115-c with respect to a plurality of locations of a plurality of light fixtures. The locations of some or all of the light fixtures may be obtained from a database stored locally on (or remotely from) the mobile device 115-b. The locations of some or all of the light fixtures may also or alternatively be determined by the light fixture commissioning controller 320-a (e.g., from encoded light signals, sensor measurements, etc.).

In some examples, the device location determination unit 410-a may include a probability function processing unit 510. The probability function processing unit 510 may be used by the device location determination unit 410-a to process at least some of the time-stamped sensor measurements using a probability function, which processing may provide the sequence of time-stamped locations of the mobile device 115-c (e.g., based on likelihood functions that indicate where the mobile device 115-c is likely to be based on one or more of the sensor measurements).

In some embodiments of the mobile device 115-c, determining the sequence of time-stamped locations of the mobile device 115-c may include estimating at least one movement of the mobile device 115-c (e.g., based on one or more of the time-stamped sensor measurements acquired by the sensor(s) 505), and determining at least a second of the time-stamped locations in relation to at least a first of the time-stamped locations and the estimated movement of the mobile device 115-c. In some cases, at least a first of the time-stamped locations may be determined based at least in part on a location of an external reference (e.g., a location of a wall, one of the light fixtures, a Wi-Fi access point, etc.).

In some embodiments, the correlation unit 415-a may be used to determine a correspondence between a time-stamped identifier of a light fixture and locations of one or more light fixtures by correlating the time-stamped identifier with the time-stamped locations of the mobile device.

In some embodiments, the correlation unit 415-a may determine a correspondence between at least two identifiers having a common time-stamp and the locations of one or more light fixtures of the plurality of light fixtures based at least in part on directions-of-arrival of the encoded light signals from which the at least two identifiers having the common time stamp are decoded.

In some embodiments, the light fixture location determination unit 515 may be used to determine a location of at least one of a plurality of light fixtures. In some embodiments, the location of a light fixture may be determined based at least in part on the direction-of-arrival of the encoded signal received from the light fixture (or the directions-of-arrival of encoded signals received from multiple light fixtures) and based at least in part on the sequence of time-stamped locations of the mobile device 115-c. In some embodiments, the location of at least two light fixtures in the plurality of light fixtures may be determined based at least in part on the directions-of-arrival of the encoded signals received from the at least two light fixtures (or the directions-of-arrival of additional encoded signals received from additional light fixtures) and based at least in part on the sequence of time-stamped locations of the mobile device 115-c. In some examples, the light fixture location determination unit 515 may be used to determine a location of light fixtures based on recorded sensor observations.

In some embodiments, part or all of the functionality of the probability function processing unit 510 and/or the light fixture location determination unit 515 may be offloaded from the mobile device 115-c to a remote server and/or building automation system.

In some embodiments, the light fixture commissioning controller 320-b may transmit a database file of identifiers and corresponding light fixture locations to a remote server, light fixture controller, and/or building automation system. In some cases, the database file may be locally stored on the mobile device 115-c until requested by the remote server, light fixture controller, and/or building automation system. In some cases, the database file may be transmitted over a WLAN and/or WWAN. The database file may be used by the mobile device 115-c and/or other devices to determine the device's position and/or orientation, and/or to navigate within a building. The database file may be used by a light fixture controller and/or building automation system to adjust the dimming level, on/off state, color, etc. of light fixtures having selected locations (e.g., in selected rooms or halls). A light fixture controller and/or building automation system may also be used, for example, to update/change the identifier associated with a light fixture (e.g., an identifier may be changed over time for security purposes, such as to ensure that the identifier of a light fixture cannot be sniffed and/or spoofed).

Figure 6:
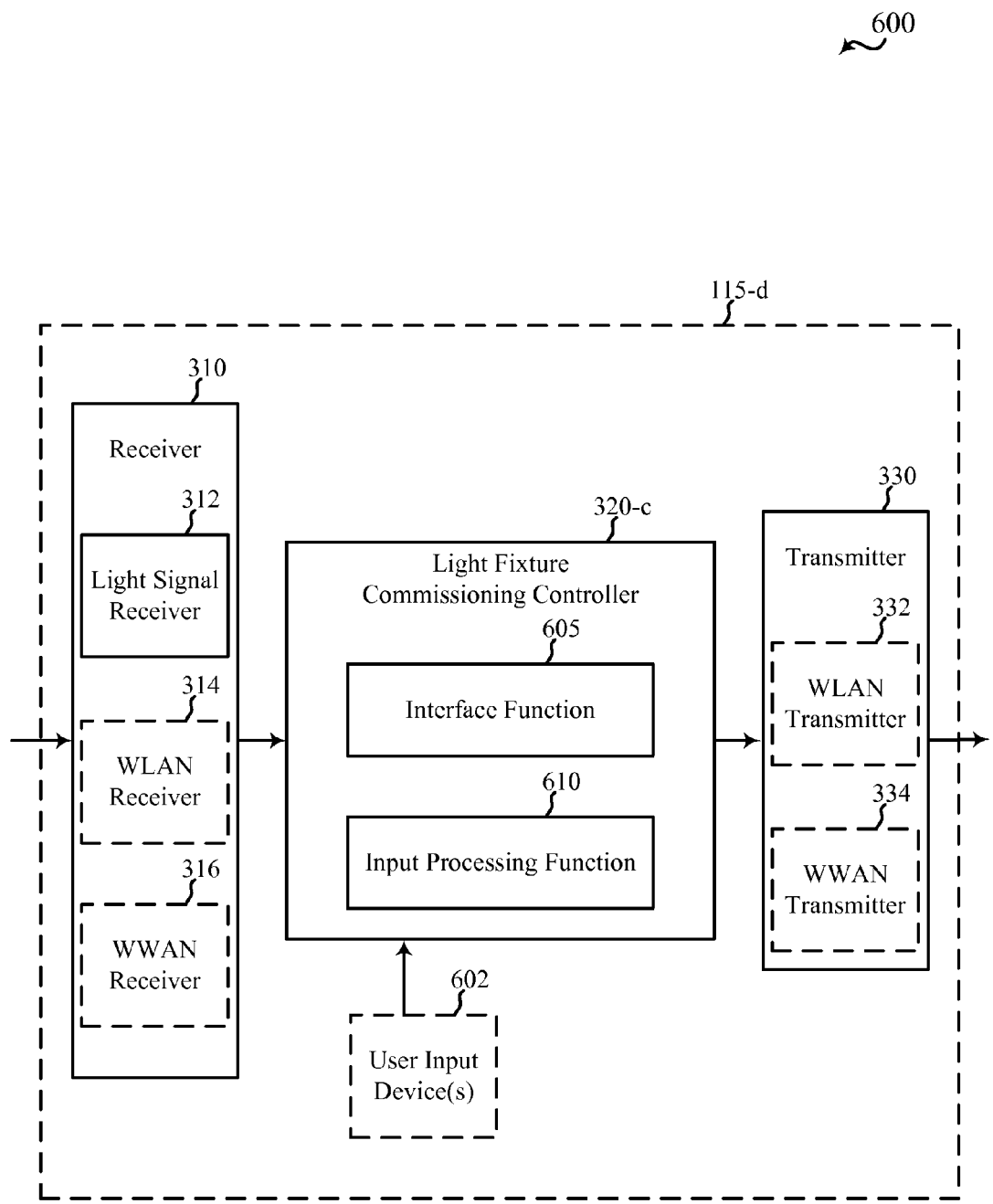
FIG. 6 is a block diagram of another example of a mobile device for commissioning light fixtures, in accordance with certain example implementations.

Referring now to FIG. 6, a block diagram 600 illustrates an example of a mobile device 115-d for commissioning light fixtures. In some examples, the light fixtures may be examples of the light fixtures 105 described with reference to FIG. 1 and/or 2. The mobile device 115-d may be an example of aspects of one or more of the mobile devices 115 described with reference to FIG. 1 and/or 3. The mobile device 115-d may in some cases be a processor. The mobile device 115-d may include a receiver 310, a light fixture commissioning controller 320-c, and/or a transmitter 330. Each of these components may be in communication with each other.

The components of the mobile device 115-d may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the receiver 310 may include a light signal receiver 312, a WLAN receiver 314, and/or a WWAN receiver 316, and the transmitter 330 may include a WLAN transmitter 332 and/or a WWAN transmitter 334. In some embodiments, the receiver 310 and transmitter 330, and applicable units therein, may be configured as described with reference to FIG. 3. In some embodiments, the light signal receiver 312 may receive encoded light signals from one or more of a plurality of light fixtures (e.g., from one of the light fixtures 105 described with reference to FIG. 1 and/or 2) and decode each light signal to obtain an identifier of a light fixture. In some embodiments, the light signal receiver 312 may receive an encoded light signal across a plurality of image frames.

The light fixture commissioning controller 320-c may be used to manage various functions related to light fixture commissioning and may include an interface function 605 and/or an input processing function 610. Each of these components may be in communication with each other. The input processing function 610 may receive user input from user input devices 602. In some cases, user input device 602 may be mobile device 115-d.

In some embodiments, the interface function 605 may be used to display information corresponding to a number of light fixtures. The information may correspond to each of the plurality of light fixtures or just some of the plurality of light fixtures. In some embodiments, the displayed information may include a map of the number of light fixtures (as well as locations of walls and other elements of a building floor plan). In some embodiments, the displayed information may include locations of the number of light fixtures (e.g., as coordinates and/or locations on a map). In some embodiments, the information may be obtained from a database stored locally on (or remotely from) the mobile device 115-d. In other embodiments, the information may be determined by the mobile device 115-d (e.g., from the encoded light signals, sensor measurements, etc.). In some embodiments, the interface function 605 may also or alternatively provide a text and/or audio input (or input/output) interface.

In some embodiments, the input processing function 610 may be used to receive and process input identifying a location of a light fixture associated with an identifier. In some embodiments, the input may include a selection from the information displayed by the interface function 605, such as a graphical selection (e.g., via a touchscreen) of the light fixture or a selection of the light fixture from a list of light fixtures (or list of coordinates of locations of light fixtures). In some embodiments, the input may include information that is manually input into (e.g., typed into) the mobile device 115-d.

In some embodiments, the light fixture commissioning controller 320-c may be used to determine a correspondence between an identifier of a light fixture and a plurality of locations of light fixtures. In some embodiments, the correspondence may be determined based on the input received and processed by the input processing function 610.

In some embodiments, the light fixture commissioning controller 320-c may transmit a database file of identifiers and corresponding light fixture locations to a remote server, light fixture controller, and/or building automation system. In some cases, the database file may be locally stored on the mobile device 115-d until requested by the remote server, light fixture controller, and/or building automation system. In some cases, the database file may be transmitted over a WLAN and/or WWAN. The database file may be used by the mobile device 115-d and/or other devices to determine the device's position and/or orientation, and/or to navigate within a building. The database file may be used by a light fixture controller and/or building automation system to adjust the dimming level, on/off state, color, etc. of light fixtures having selected locations (e.g., in selected rooms or halls). A light fixture controller and/or building automation system may also be used, for example, to update/change the identifier associated with a light fixture (e.g., an identifier may be changed over time for security purposes, such as to ensure that the identifier of a light fixture cannot be sniffed and/or spoofed).

Figure 7:
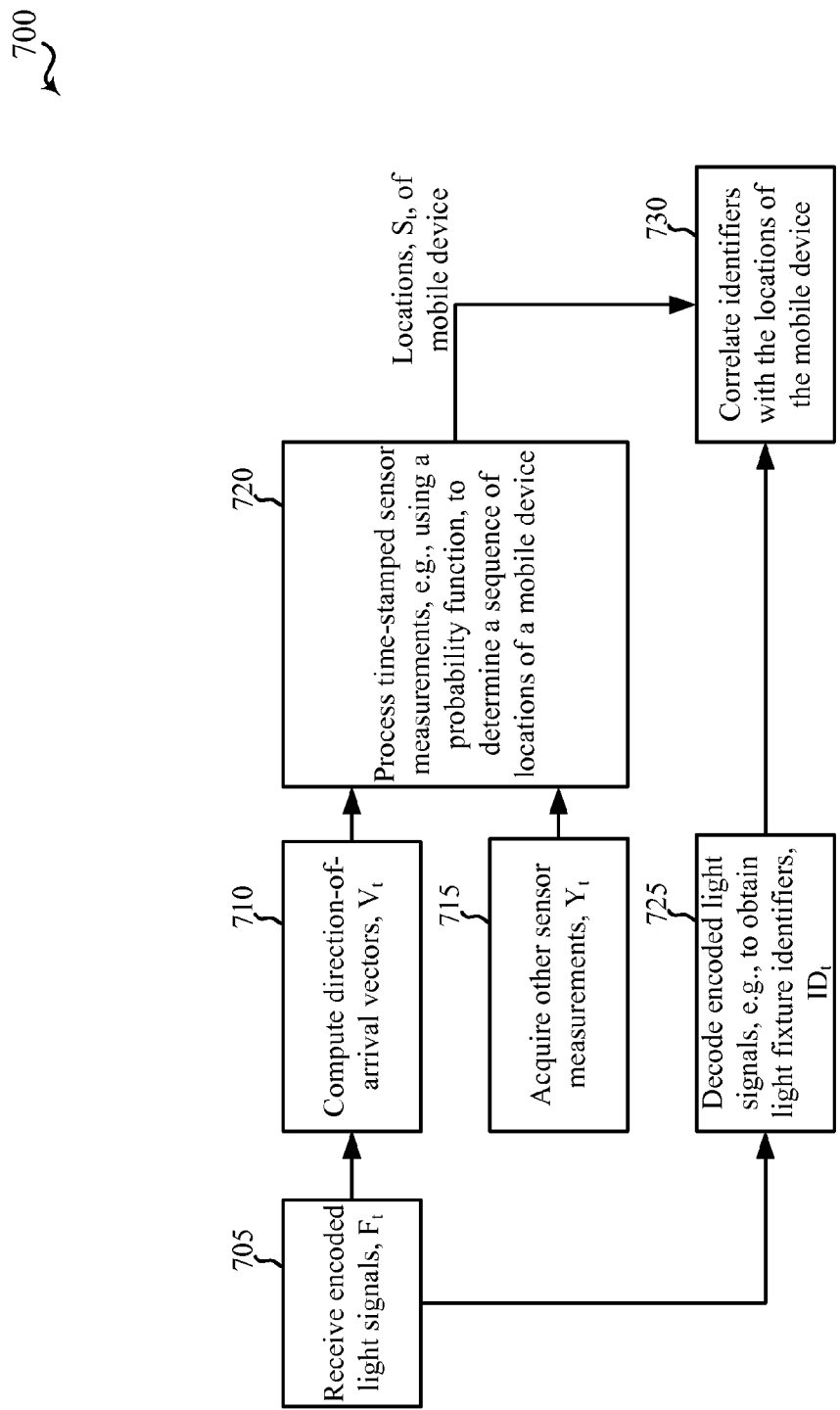
FIG. 7 is a block diagram of another example set of processing blocks for commissioning light fixtures, in accordance with certain example implementations.

FIG. 7 is a block diagram 700 of an example set of processing blocks for commissioning light fixtures. In some examples, the processing blocks may be performed and/or managed by a mobile device, such as one of the mobile devices 115 described with reference to FIG. 1, 3, 4, and/or 5, or by one of the mobile devices 115 in combination with a remote server and/or building automation system.

At block 705, a plurality of encoded light signals, $F_t$, t $\in[0,T]$, may be received from a plurality of light fixtures (e.g., one or more encoded signals may be received from one or several light fixtures of the plurality) at times t, where t is a time-stamp between 0 and T. In some examples, the light fixtures may be examples of aspects of the light fixtures 105 described with reference to FIG. 1 and/or 2. The operation(s) at block 705 may be performed and/or managed using the light signal receiver 312 described with reference to FIG. 3, 4, and/or 5.

At block 710 and block 715, time-stamped sensor measurements may be acquired. At block 710, a direction-of-arrival vector, $V_t$, t$\in[0,T]$, may be acquired (e.g., computed) for each received encoded signal, $F_t$.

At block 715, other time-stamped sensor measurements, $Y_t$, t∈[0,T], including, for example, other camera measurements, inertial measurements, magnetic measurements, radio measurements (e.g., Wi-Fi signaling measurements such as RSSI and/or WWAN signaling measurements such as CIR), or a combination thereof, may be acquired. The times at which the sensor measurements are acquired may or may not be the same as the times at which the fixtures are detected.

The operation(s) at block 710 and/or block 715 may be performed and/or managed using the receiver 310 described with reference to FIG. 3, 4, and/or 5, and/or the sensor(s) 505 described with reference to FIG. 5.

At block 720, the time-stamped sensor measurements acquired at block 710 and/or block 715 may be processed using a probability function (e.g., a Bayesian interference model) to determine a sequence of time-stamped locations, $S_t$, of the mobile device 115. In some examples, the time-stamped measurements may be processed using motion constraints, as described, for example, in FIG. 10.

In some examples, the probability function applied at block 720 may take the form of:

$$S_t = \mathrm{argmax}_{x_t \in s} p(x_t | Y_1, Y_2, \ldots, Y_t, V_1, V_2, \ldots, V_t, \mathrm{ID}_1 \mathrm{ID}_2, \ldots, \mathrm{ID}_t)$$

The time-stamped locations, $S_t$, may represent the most likely locations of the mobile device 115 at times t. The operation(s) at block 720 may be performed and/or managed using the light fixture commissioning controller 320 described with reference to FIG. 3, 4, and/or 5, the probability function processing unit 510 described with reference to FIG. 5, the device location determination unit 410 described with reference to FIG. 4 and/or 5, and/or a device (e.g., a server and/or building automation system) located remotely from the mobile device 115.

At block 725, the encoded light signals, $F_t$, may be decoded to obtain a plurality of time-stamped identifiers, $\mathrm{ID}_t$, t∈[0,T]. The operation(s) at block 725 may be performed and/or managed using the receiver 310 described with reference to FIG. 3, 4, and/or 5, the time-stamp unit 405 described with reference to FIG. 4 and/or 5, and/or the sensor(s) 505 described with reference to FIG. 5.

At block 730, the time-stamped identifiers, $\mathrm{ID}_t$, and the time-stamped locations, $S_t$, of the mobile device 115 may be correlated (e.g., as $(\mathrm{ID}_t, S_t)$, t∈[0,T]. When the time-stamp of an identifier, $\mathrm{ID}_t$, differs from the time-stamps of the locations, $S_t$, of the mobile device 115, the identifier may be correlated with the locations of the mobile device 115 by matching the identifier to a closest location of the mobile device 115 in time, and/or by matching an identifier to an extrapolated location of the mobile device 115. The operation(s) at block 730 may be performed and/or managed using the light fixture commissioning controller 320 described with reference to FIG. 3, 4, 5, and/or 6, the probability function processing unit 510 described with reference to FIG. 5, the correlation unit 415 described with reference to FIG. 4 and/or 5, and/or a device (e.g., a server and/or building automation system) located remotely from the mobile device 115.

Figure 8:
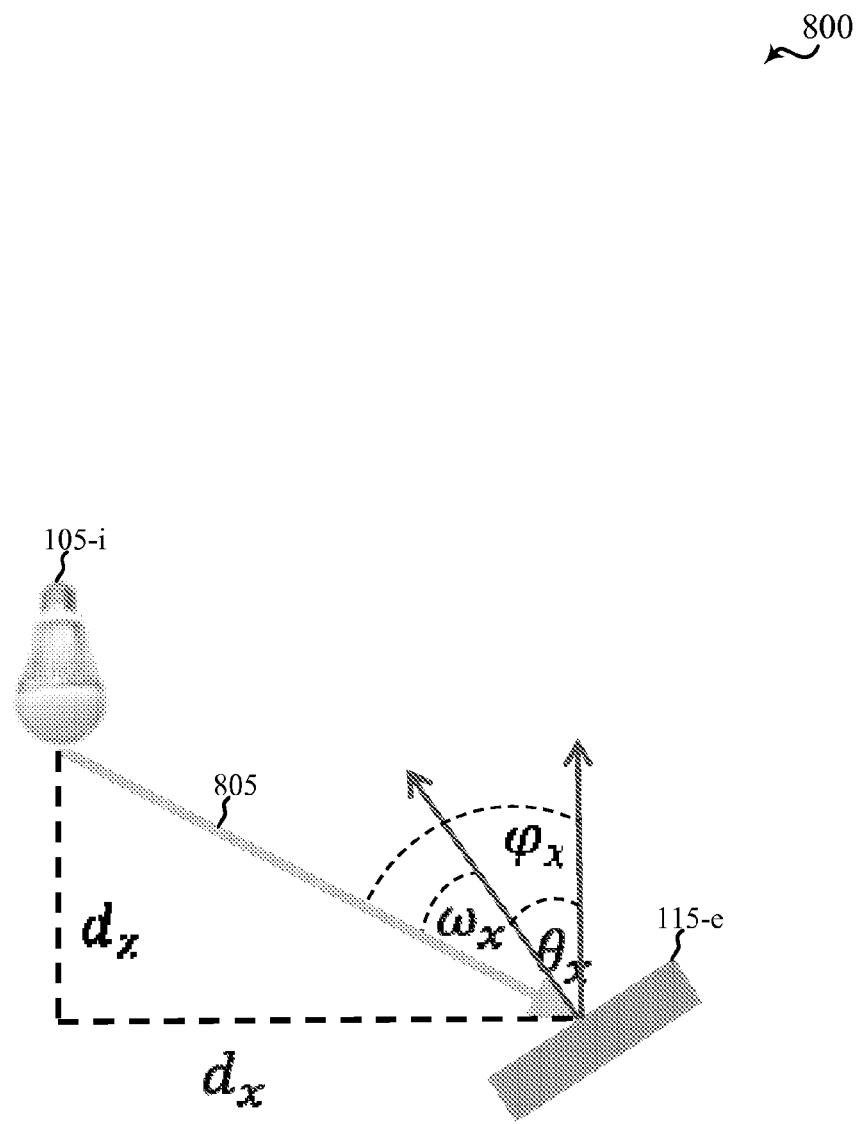
FIG. 8 illustrates an example relationship between the locations of a light fixture and a mobile device, in accordance with certain example implementations.

FIG. 8 illustrates an example relationship 800 between the locations of a light fixture 105-$i$ and a mobile device 115-$e$. In some examples, the light fixture 105-$i$ may be an example of aspects of one or more of the light fixtures 105 described with reference to FIG. 1 and/or 2, and the mobile device 115-$e$ may be an example of aspects of one or more of the mobile devices 115 described with reference to FIG. 1, 3, 4, 5, and/or 6. The light fixture 105-$i$ may be distances $d_x$ and $d_y$ from the mobile device 115-$e$ in an x-y plane parallel to the earth's surface, and may be a height $d_z$ from the mobile device 115-$e$, which height is perpendicular to the x-y plane. The direction-of-arrival of a encoded light signal 805 transmitted by the light fixture 105-$i$ may be expressed in terms of a pair of angles ($\omega_x$, $\omega_y$) relative to a coordinate system of the mobile device 115-$e$, or in terms of a pair of angles ($\phi_s$, $\phi_y$) relative to the x-y plane parallel to the earth's surface. The pair of angles ($\phi_s$, $\phi_y$) may be derived from the pair of angles ($\omega_x$, $\omega_y$) by compensating for the orientation ($\theta_s$, $\theta_y$) of the mobile device 115 relative to the x-y plane parallel to the earth's surface. In some cases, the encoded light signal may be a VLC signal.

When an image sensor is used to receive encoded light signals, each pixel of the image sensor may be mapped to a unique direction-of-arrival ($f_x$, $\omega_y$) relative to the coordinate system of the mobile device 115-$e$. When the location of the mobile device 115-$e$ is known, the location of the light fixture 105-$i$ may be determined based at least in part on the location of the mobile device 115-$e$ and the direction-of-arrival of a encoded light signal 805 received from the light fixture 105-$i$. When the location of the light fixture 105-$i$ is known, the location of the mobile device 115-$e$ may be determined based at least in part on the location of the light fixture 105-$i$ and the direction-of-arrival of the encoded light signal 805. In some cases, the location of the mobile device (e.g., when determined based on a location of one or several light fixtures) may be translated into GPS coordinates, a street address, or the like, and may be communicated to a network or network operator via, for instance, a WLAN or WWAN transmitter of the device. The determined location of the device may thus be used to provide a dispatchable address of the mobile's location, which may be used to support emergency response services, for example.

Figure 9:
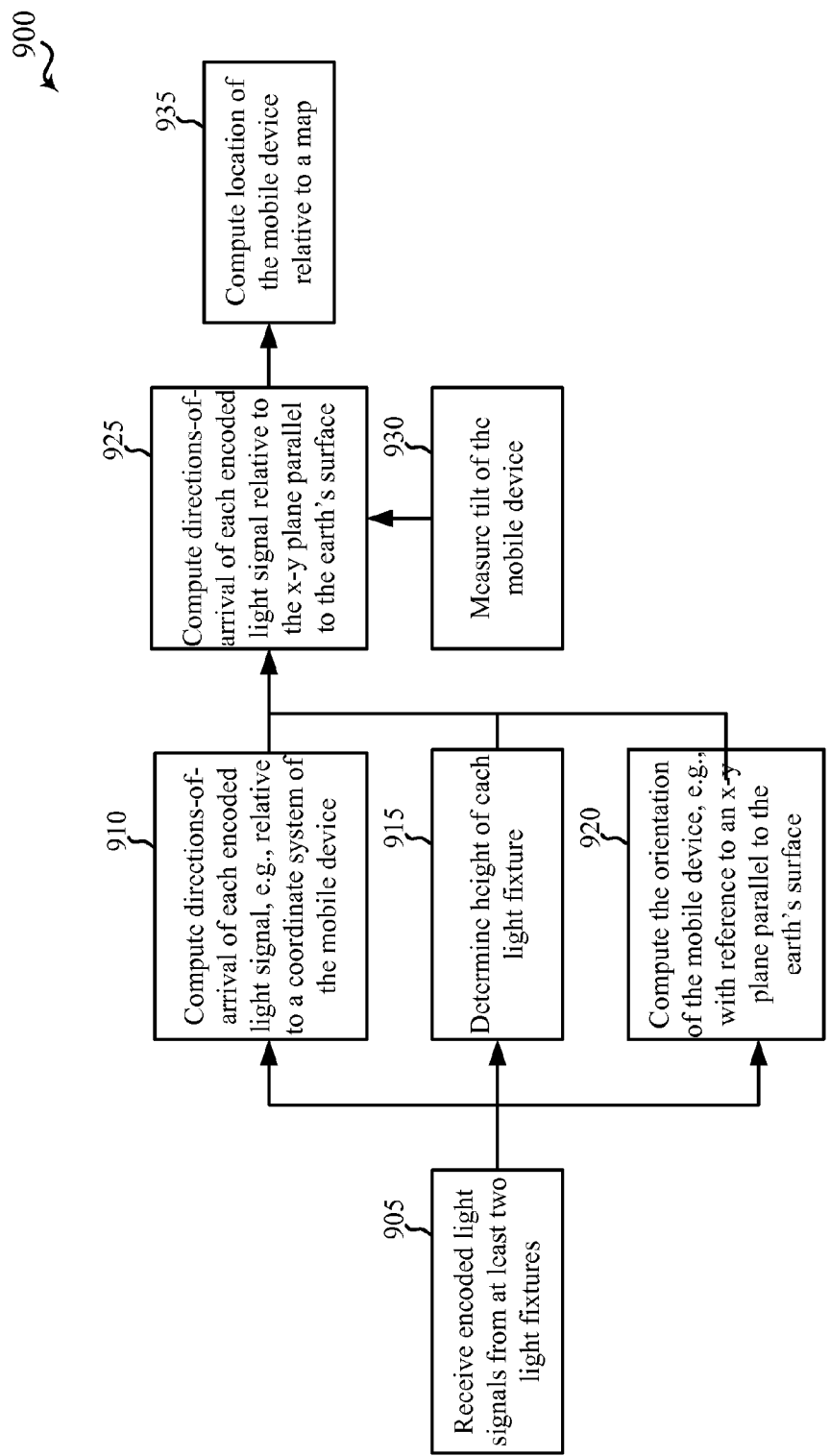
FIG. 9 is a block diagram of an example set of processing blocks for determining a location of a mobile device with respect to a plurality of locations of a plurality of light fixtures, in accordance with certain example implementations.

FIG. 9 is a block diagram 900 of an example set of processing blocks for determining a location of a mobile device with respect to a plurality of locations of a plurality of light fixtures. In some examples, the processing blocks may be performed and/or managed by a mobile device, such as one of the mobile devices 115 described with reference to FIG. 1, 3, 4, 5, and/or 8, or by one of the mobile devices 115 in combination with a remote server and/or building automation system. In some examples, the plurality of light fixtures may be the plurality of light fixtures 105 described with reference to FIG. 1, 2, and/or 8.

At block 905, encoded light signals may be received from at least two light fixtures 105 having known (x, y) image coordinates.

At block 910, the direction-of-arrival of each encoded light signal may be computed in terms of a pair of angles ($\omega_x$, $\omega_y$) relative to a coordinate system of the mobile device 115. At block 915, the height of each light fixture 105 with reference to an x-y plane parallel to the earth's surface may be determined (e.g., by computation and/or lookup). At block 920, the orientation ($\theta_s$, $\theta_y$) of the mobile device 115 relative to the x-y plane parallel to the earth's surface may be computed.

At block 925, a tilt of the mobile device 115 relative to a gravity vector (e.g., in a z-x plane and a z-y plane) may be measured (e.g., based on gyroscope and/or accelerometer measurements). At block 930, the direction-of-arrival of each encoded light signal may be computed in terms of a pair of angles ($\phi_s$, $\phi_y$) relative to the x-y plane parallel to the earth's surface.

At block 935, a location of the mobile device 115 may be computed relative to a map based on the known (x, y) image coordinates of the light fixtures 105. As described above, the computed location of the mobile device may serve as the basis for providing a dispatchable address.

Figure 10:
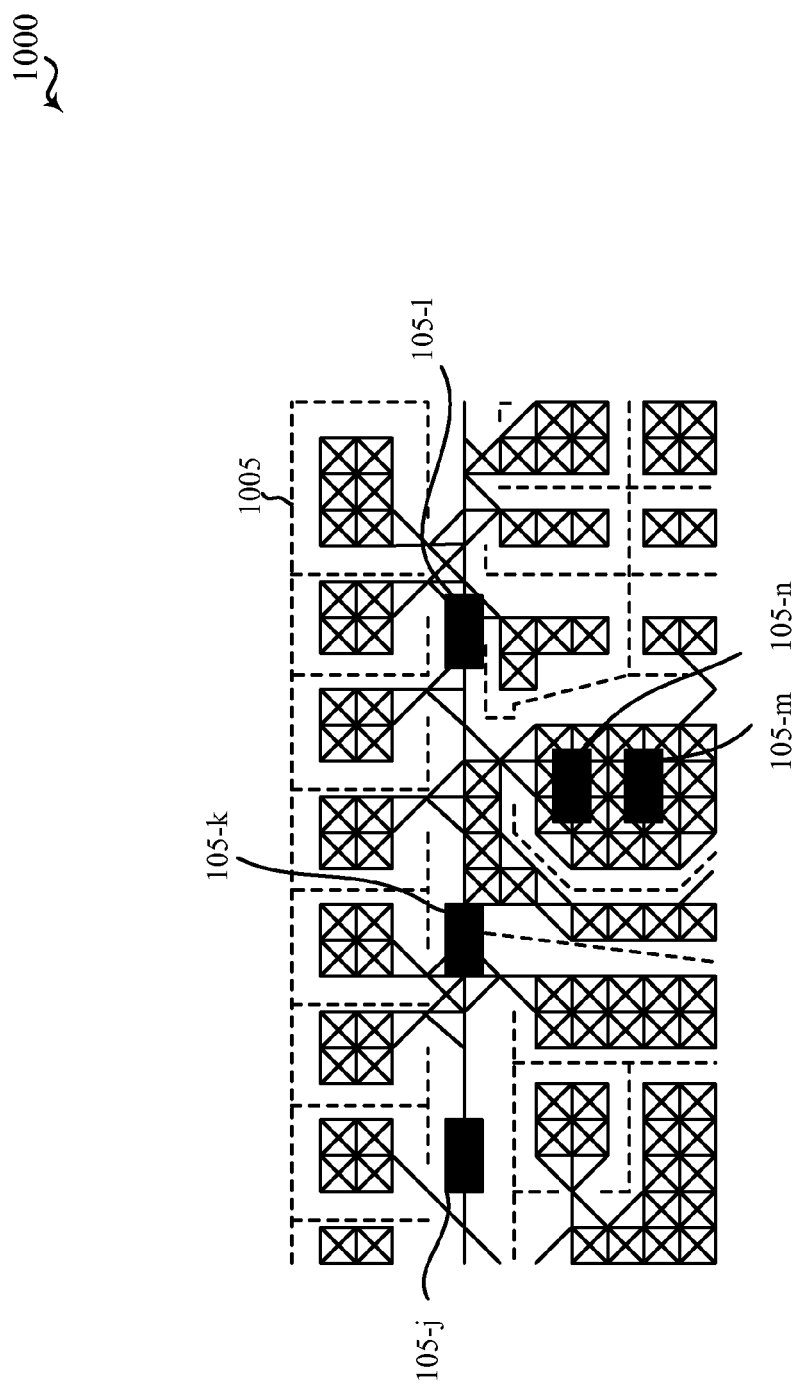
FIG. 10 illustrates another example map of a number of light fixtures, in accordance with certain example implementations.

FIG. 10 illustrates an example map 1000 of a number of light fixtures. In some examples, the light fixtures may be examples of aspects of the light fixtures 105 described with reference to FIG. 1, 2, and/or 8. The map 1000 illustrates an example of motion constraints that may be imposed on a probability function, such as the probability function applied by the probability function processing unit 510 described with reference to FIG. 5 and/or at the block 720 described with reference to FIG. 7.

The map 1000 may in some cases be a map of a building floor or other venue, and may be discretized into a grid of locations. The motion of a mobile device (e.g., one of the mobile devices 115 described with reference to FIG. 1, 3, 4, 5, 6, and/or 8) may be modeled as a random walk on the grid of locations, satisfying motion constraints. The solid lines in FIG. 10 may represent the allowable transitions between locations, which may include rooms bounded by walls 1005. Thus, the motion constraints of a mobile device 115 may be obtained from the map 1000. The locations of light fixtures 105-$j$, 105-$k$, 105-$l$, 105-$m$, and 105-$n$, which may be examples of the light fixtures 105 described with reference to FIG. 1, 2, and/or 8, may also be obtained from the map 1000. A sequence of locations of a mobile device 115 may be determined, for example, by processing a plurality of time-stamped sensor measurements of the mobile device 115 using a probability function, such as a recursive Bayesian interference model (e.g., a model applying a backward-forward algorithm such as the Bahl, Cocke, Jelinek and Raviv (BCJV) algorithm, a model applying a Kalman filter, and/or a model applying a Viterbi algorithm).

In some examples, a backward-forward algorithm may be based on a sequence of sensor measurements over time (e.g., $Y_N=(y_1, y_w, \ldots, y_N)$) and may involve computing map locations as $\max_{s\in[1,\ldots,K]} P(s|Y_N)$, where motion of a mobile device 115 is modeled as a random walk $p(s_n|s_{n-1})$. In computing the map locations, the probability, p, of observing a sensor measurement, y, of a particular type at a particular location, s, may be defined by the likelihood function p(y|s). The probability, p, may be pre-computed for each of a number of sensors, given knowledge of the physics of the sensor. The probability that a mobile device 115 is at a location (i.e., state) "j" at a time "n" may be recursively computed given the motion model described with reference to FIG. 10, the likelihood function(s) for each sensor on which the backward-forward algorithm is based, and past location (i.e., past state) probabilities, as described by the function:

$$p_{s_n}(j) \propto p_{y|s}(y_n \mid j) \sum_i p_{s_{n-1}}(i) p_{s_n|s_{n-1}}(j \mid i)$$

Figure 11A:
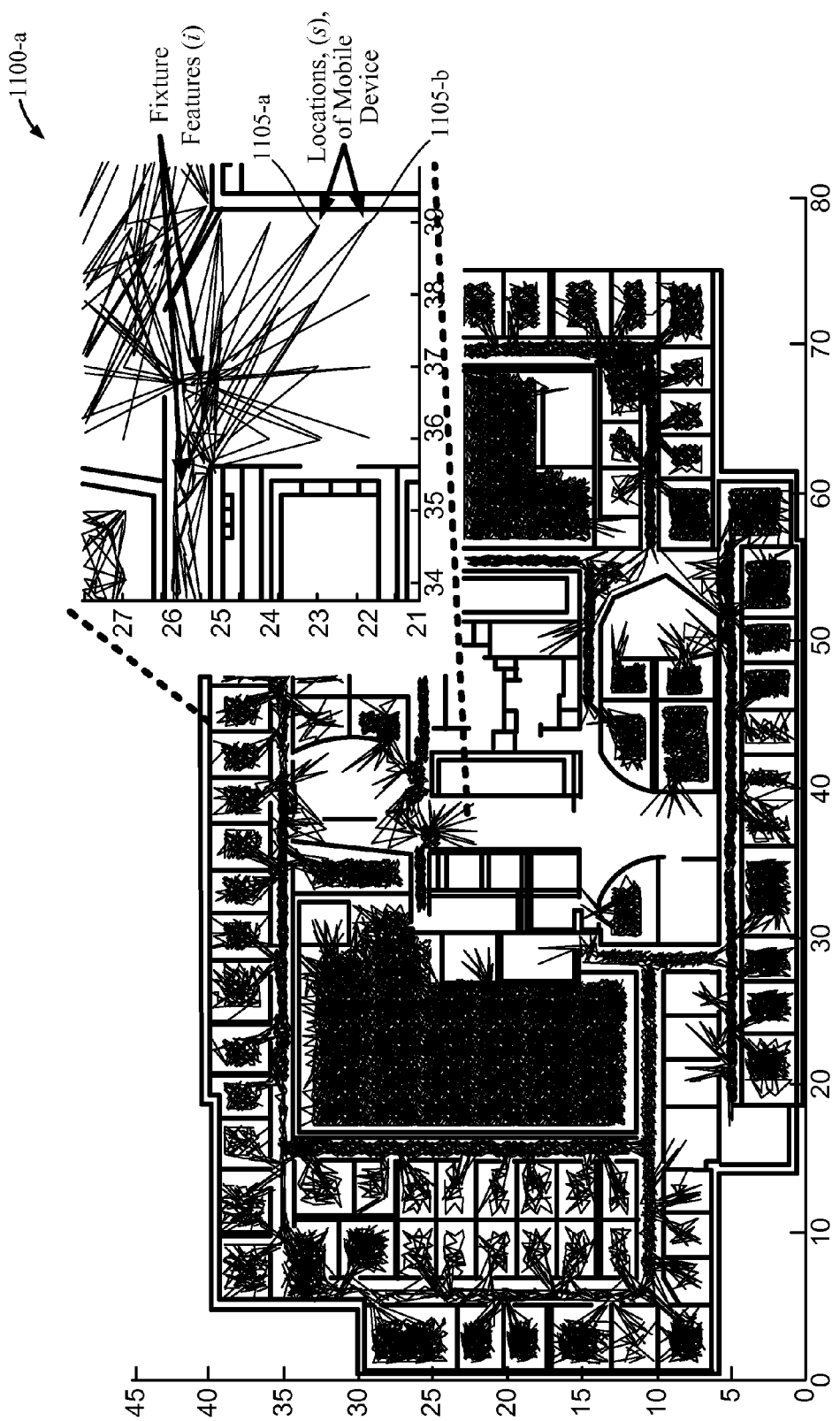
FIG. 11A illustrates a ray-tracing model which serves as the basis for an example likelihood function based on directions-of-arrival of encoded light signals received from a plurality of light fixtures, at a mobile device, at different locations of the mobile device, in accordance with certain example implementations.

FIG. 11A illustrates a ray-tracing model 1100-$a$ which serves as the basis for an example likelihood function based on directions-of-arrival of encoded light signals received from a plurality of light fixtures, at a mobile device 115, at different locations 1105-$a$, 1105-$b$ of the mobile device 115. The likelihood function may be expressed as:

$$p(V|s) \sim \Sigma_i CN(\mu_i(s), \sigma^2 I)$$

where $\mu_i(s)$ is the expected direction-of-arrival vector from fixture feature i to mobile device location s. (e.g., location 1105-$a$ or 1105-$b$). The quantity $\mu_i(s)$ may be pre-computed for every s and i, as shown by the ray-tracing model 1100.

The ray-tracing model 1100 may take into account venue features such as wall and light fixture locations. In some examples, the fixture features, i, may include light fixture corners, centroids, sticker locations, etc. The quantity $\sigma^2$ may capture an uncertainty in light fixture location, and may be a priori assumed uniform across s and i.

In some cases, the likelihood function based on directions-of-arrival of encoded light signals may be extended to include single-camera frame observations of multiple light fixtures, resulting in a likelihood function with less entropy.

Figure 11B:
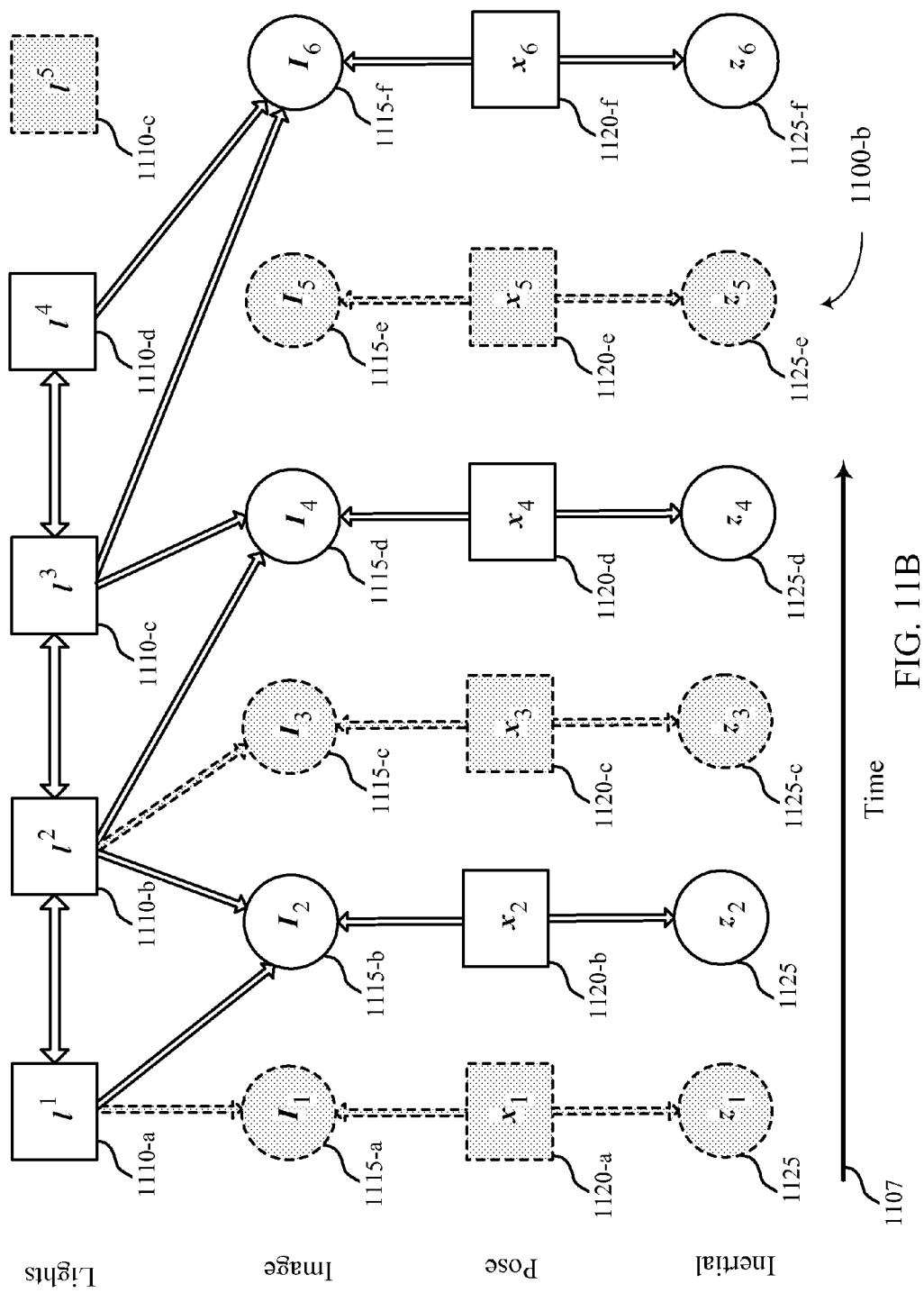
FIGS. 11B and 11C illustrate example techniques for determining locations of one or more light fixtures with a mobile device, in accordance with certain example implementations.

Referring to FIG. 11B, a diagram of a ray-tracing model 1100-$b$ illustrates an example technique for determining locations of one or a number of light fixtures 1110-$a$, 1110-$b$, 1110-$c$, 1110-$d$, and 1110-$e$ with a mobile device. In some cases, locations of the light fixtures 1110 are initially unknown.

Data may be collected along a trajectory of unknown poses 1120-$a$, 1120-$b$, 1120-$c$, 1120-$d$, 1120-$e$, and 1120-$f$ of the mobile device during a period of time 1107. Data associated with sensor observations may include, for example, image 1115-$a$, 1115-$b$, 1115-$c$, 1115-$d$, 1115-$e$, and 1115-$f$ captured by the mobile device, and inertial measurements 1125-$a$, 1125-$b$, 1125-$c$, 1125-$d$, 1125-$e$, and 1125-$f$ of the mobile device. Images may be captured by a photo detector or array of photo detectors (e.g., an image sensor). Image information may be a function of light location and pose of the mobile device. In this regard, inertial sensors may provide inertial measurements to supply device orientation information. In some cases, multiple sensor observations may be performed by a single sensor on the mobile device.

In some examples, each of the light fixtures 1110 may include a driver circuit and one or more light emitting elements, as described herein. The light emitting elements may include one or more light emitting elements that provide ambient illumination, and one or more light emitting elements (e.g., one or more light emitting diodes (LEDs)) that may be used to transmit an encoded signal in which an identifier of the light fixture is encoded. In some cases, the one or more light emitting elements that are used to transmit the encoded signal may be the same one or more light emitting element that provides the ambient illumination.

In some cases, the mobile device can communicate over one or more access networks, such as but not limited to, one or more wireless local area network (WLANs) and/or one or more wireless wide area networks (WWANs). The mobile device may communicate over the one or more access networks with, for example, a server, a light fixture controller, a building automation system, and/or the light fixtures 1110.

As the mobile device moves (or is moved) under one or more of the light fixtures 1110, the image sensor of the mobile device may receive light emitted by one or more of the light fixtures 1110-$a$, 1110-$b$, 1110-$c$, 1110-$d$, and 1110-$e$, and capture images 1115-$a$, 1115-$b$, 1115-$c$, 1115-$d$, 1115-$e$, and 1115-$f$ of part or all of one or more of the light fixtures 1110-$a$, 1110-$b$, 1110-$c$, 1110-$d$, and 1110-$e$. The captured images may include illuminated light fixture features, such as corners and/or centroids of the light fixtures 105, stickers or other indicia illuminated by the light fixtures 1110.

For example, as represented in FIG. 11B, image 1115-$a$ may include illuminated light fixture features of light fixture 1110-$a$; image 1115-$b$ may include illuminated light fixture features of light fixture 1110-$a$ and light fixture 1110-$b$; image 1115-$c$ may include illuminated light fixture features of light fixture 1110-$b$; image 1115-$d$ may include illuminated light fixture features of light fixture 1110-$b$ and light fixture 1110-c; image 1115-e may not include any illuminated light fixture features of the light fixtures 1110; and image 1115-f may include illuminated light fixture features of light fixture 1110-c and light fixture 1110-d. During an example trajectory, illuminated light fixture features for one or more of the number of light fixtures (e.g., light fixture 1110-e) may not be captured in any images 1115.

Alternatively or additionally, the mobile device may receive, from one or more of the light fixtures 1110, encoded light signals in which identifiers of the light fixtures 1110-a, 1110-b, 1110-c, 1110-d, and 1110-e are encoded. The received identifier(s) may be used by the mobile device for determining light fixture mapping in conjunction with the received sensor observations (e.g., images 1115 and inertial measurements 1125). For example, collected images 1115, inertial measurements 1125, and/or sensor readings may impose linear constraints on the locations of the light fixtures 1110.

Figure 11C:
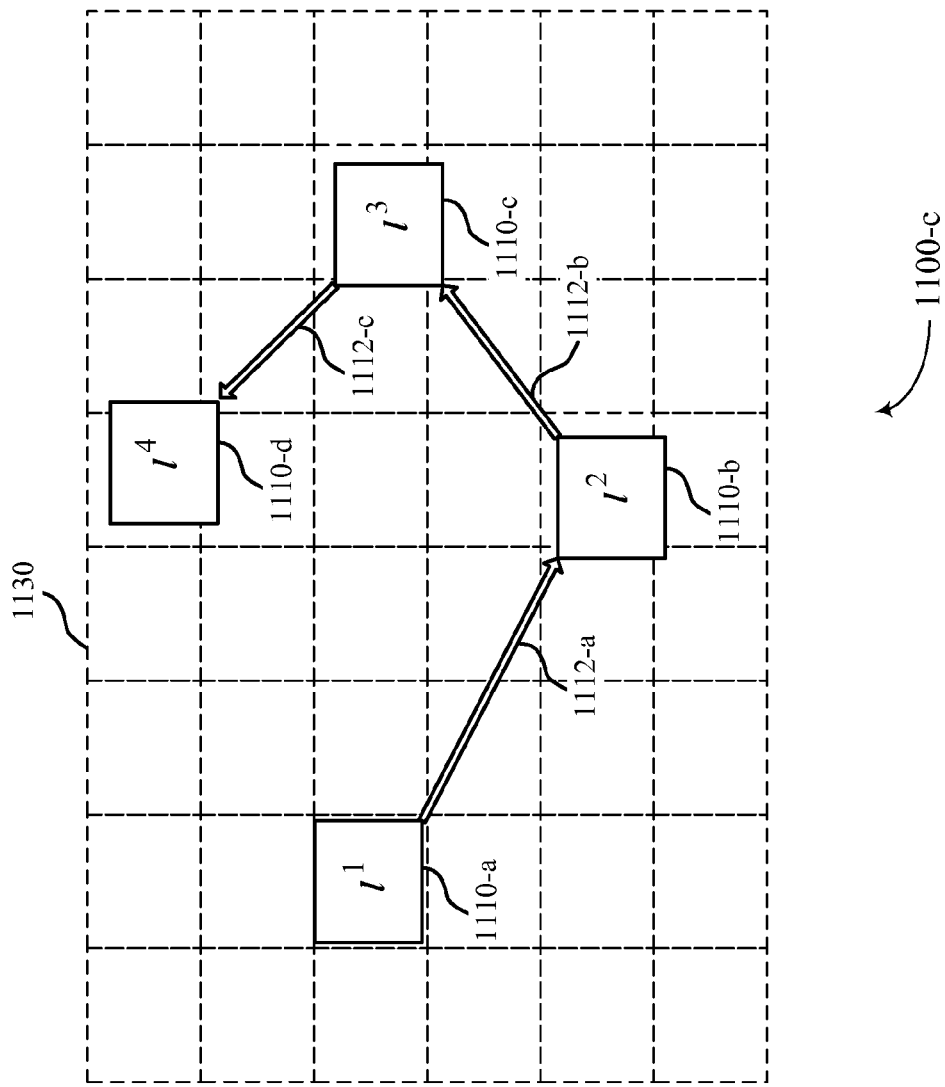
Figure 11C:
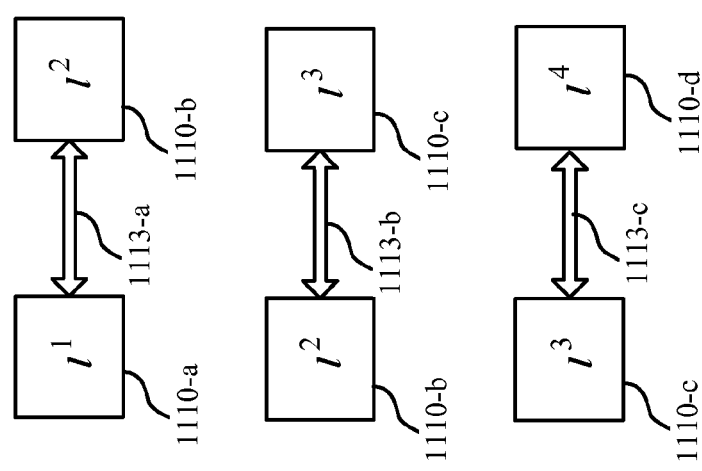

As further illustrated in FIG. 11C, a mobile device may estimate linear pairwise constraints between light fixtures 1110-a, 1110-b, 1110-c, and 1110-d in a ceiling grid 1130, which may be used for determining a location of one or more light fixtures with the mobile device. Pair wise constraints may be derived from received sensor observations (e.g., images 1115 and inertial measurements 1125). Light fixtures 1110-a and 1110-b, may be separated by an offset vector 1112-a, which may be the basis of a first pairwise constraint 1113-a. Likewise, an offset vector 1112-b between light fixtures 1110-b and 1110-c may be represented by a second pairwise constraint 1113-b; and an offset vector 1112-c between light fixtures 1110-c and 1110-d may be represented by a third pairwise constraint 1113-c. In some cases, the number of pairwise constraints may be one less than the number of light fixtures; but in some cases, the number of pairwise constraints may be as many as the number of light fixtures 1110. The pairwise constraints may be combined into a matrix representation of a combined linear restraint on the combined positioning of the light fixtures 1110. In some cases, an additional arbitrary constraint may be included to represent an origin position, which may be mapped to an origin position of, for example, a ceiling grid 1130. More observation results, and a calculation involving more constrains, may be used to more accurately determine locations of the light fixtures 1110 within the ceiling grid 1130.

An example technique (e.g., an algorithm, model, or like process) to perform ceiling light fixture mapping and refinement thereof may be based on graphical models as shown in FIGS. 11B and 11C. However, it is to be appreciated that the disclosed light fixture mapping techniques are applicable to other implementations, including floor lighting and wall lighting scenarios. In some cases, when a path of pairwise vectors exist between every two light fixtures 1110, all light fixtures 1110 can be mapped, in accordance with some embodiments.

Figure 12:
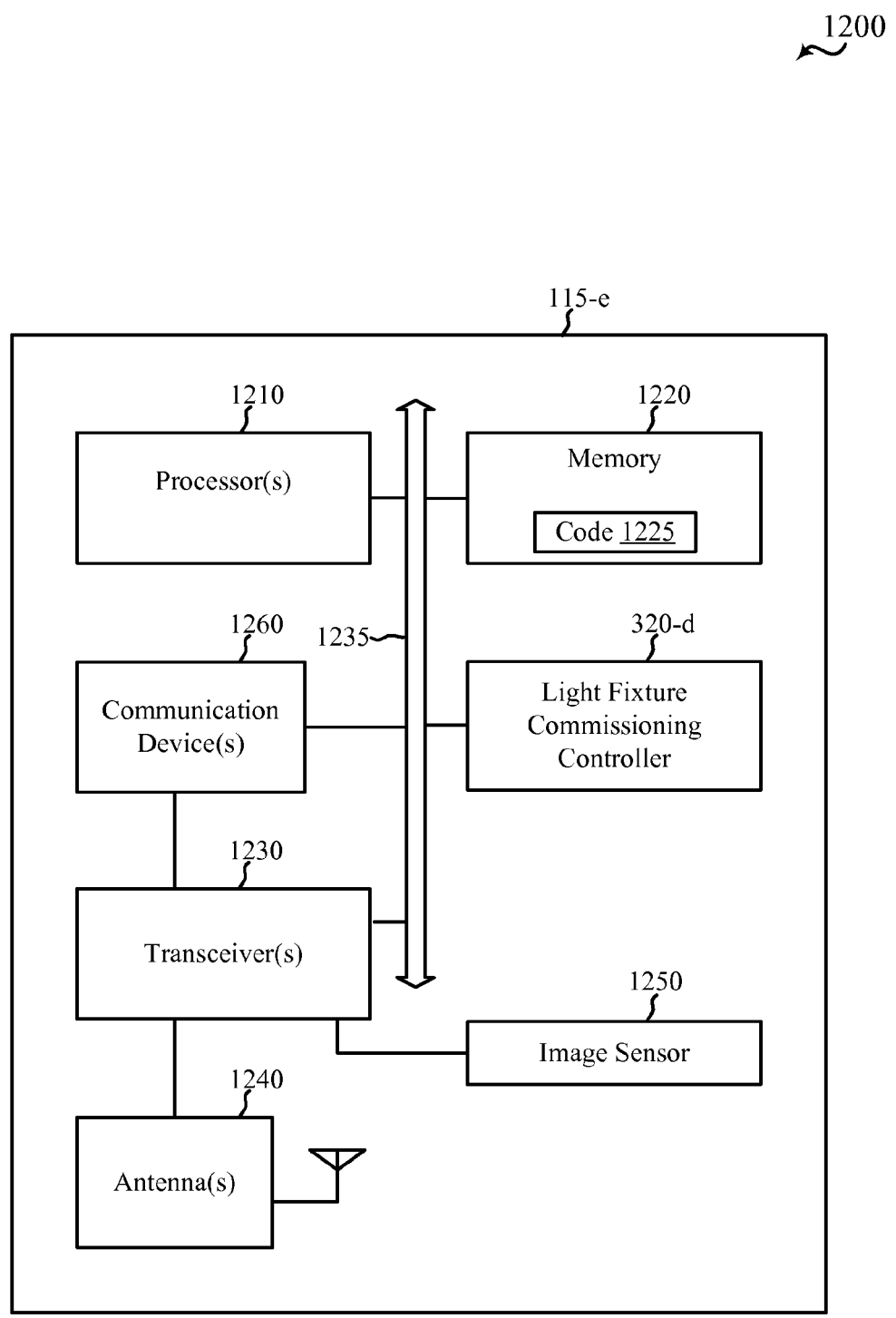
FIG. 12 is a block diagram illustrating an example of another mobile device usable in commissioning light fixtures, in accordance with certain example implementations.

FIG. 12 is a block diagram 1200 illustrating an example of a mobile device 115-f usable in commissioning light fixtures such as the light fixtures 105 described with reference to FIG. 1, 2, 8, and/or 10. The mobile device 115-f may be an example of aspects of one or more of the mobile devices 115 described with reference to FIG. 1, 3, 4, 5, and/or 6. The mobile device 115-f may have any of various configurations and may in some cases be or include a cellular device (e.g., a smartphone), a computer (e.g., a tablet computer), a wearable device (e.g., a watch or electronic glasses), a portion or assembly associated with a vehicle or robotic machine (e.g., a part or assembly associated with a forklift or vacuum cleaner), etc.

In some embodiments, the mobile device 115-f may have an internal power supply (not shown), such as a small battery, to facilitate mobile operation.

The mobile device 115-f may include a processor 1210, a memory 1220, at least one transceiver capability (represented by transceiver(s) 1230), at least one antenna (represented by antenna(s) 1240), an image sensor 1250, and/or a light fixture commissioning controller 320-d. Each of these components may be in communication with each other, directly or indirectly, over one or more buses 1235.

The memory 1220 may include random access memory (RAM) and/or read-only memory (ROM). The memory 1220 may store computer-readable, computer-executable code 1225 containing instructions that are configured to, when executed, cause the processor 1210 to perform various functions described herein, such as functions related to the commissioning of light fixtures from which encoded light signals are received. Alternatively, the code 1225 may not be directly executable by the processor 1210 but be configured to cause the mobile device 115-f (e.g., when compiled and executed) to perform several of the functions described herein.

The processor 1210 may include an intelligent hardware device, e.g., a CPU, such as an ARM® based processor or those made by Intel® Corporation or AMD®, a microcontroller, an ASIC, etc. The processor 1210 may process information received via the receiver capability of transceiver(s) 1230, as well as information to be transmitted from the mobile device 115-f via the transmitter capability of transceiver(s) 1230. The processor 1210 may handle, alone or in connection with the light fixture commissioning controller 320-d, various aspects related to commissioning light fixtures 105.

Transceiver(s) 1230 may include a modem configured to modulate packets and provide the modulated packets to the antenna(s) 1240 for transmission, and to demodulate packets received from the antenna(s) 1240. Transceiver (s) 1230 may in some cases be implemented as one or more transceivers. Transceiver(s) 1230 may be configured to communicate uni-directionally or bi-directionally, via the antenna (s) 1240, with one or more other devices, such as an access point or base station of a wireless communications network, one or more controllers for a number of light fixtures 105 (including, for example, a building automation system), one or more other mobile devices 115, and/or one or more light fixtures 105. In some cases, the mobile device 115-f may be a cellular or Wi-Fi device capable of communicating with one or more cellular or Wi-Fi capable access points, base stations, controllers, mobile devices 115, and/or light fixtures 105. While the mobile device 115-f may include a single antenna, there may be embodiments in which the mobile device 115-f may include multiple antennas 1240. In some examples, the processor 1210 and/or light fixture commissioning controller 320-d may communicate directly with transceiver(s) 1230. In some examples, the processor 1210 and/or light fixture commissioning controller 320-d may communicate with transceiver (s) 1230 via one or more of communication device(s) 1260.

The image sensor 1250 may in some cases include a complimentary metal-oxide semiconductor (CMOS) image sensor and/or rolling shutter image sensor of a camera. The image sensor 1250 may be used to acquire images of light fixtures 105 and/or to receive encoded light signals from light fixtures 105.

The light fixture commissioning controller 320-d may be used to commission (or to assist in the commissioning of) one or more light fixtures in a plurality of light fixtures. By way of example, the light fixture commissioning controller 320-*d* may be a component of the mobile device 115-*f* in communication with some or all of the other components of the mobile device 115-*f* over the one or more buses 1235. Alternatively, functionality of the light fixture commissioning controller 320-*d* may be implemented as a computer program product and/or as one or more controller elements of the processor 1210. In some embodiments, the light fixture commissioning controller 320-*d* may be an example of aspects of one or more of the light fixture commissioning controllers 320 described with reference to FIG. 3, 4, 5, and/or 6.

The components of the mobile device 115-*f* may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted units, etc., may comprise an applicable means for performing all or part of one or more functions related to operation of the mobile device 115-*f.*

Figure 13:
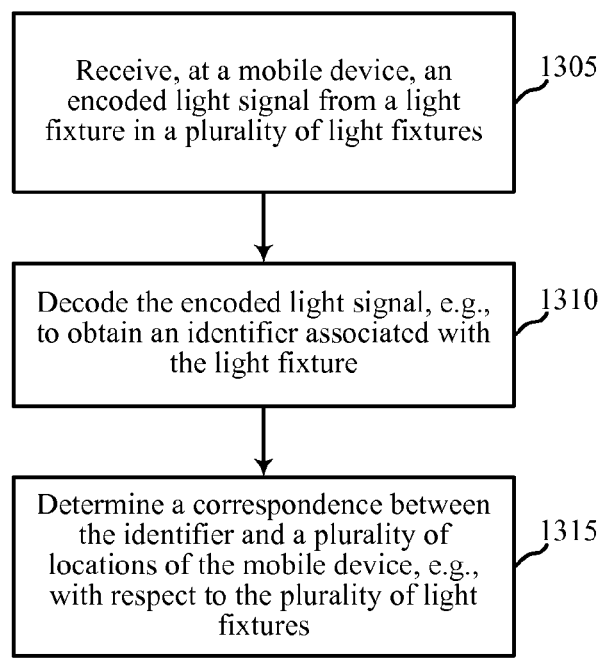
FIG. 13 is a flow chart illustrating a method for commissioning light fixtures, in accordance with certain example implementations.

FIG. 13 is a flow chart illustrating a method 1300 for commissioning or mapping light fixtures. For clarity, the method 1300 is described below with reference to aspects of one or more of the mobile devices 115 described with reference to FIG. 1, 3, 4, 5, 6, and/or 12. In some examples, the light fixture commissioning controller 320 described with reference to FIG. 3, 4, 5, 6, and/or 12 may execute one or more sets of codes to perform the functions described below.

At block 1305, the method 1300 may include receiving, at a mobile device 115, an encoded light signal from a light fixture in a plurality of light fixtures (e.g., from one of the light fixtures 105 described with reference to FIGS. 1, 2, 8, 10, 11A, 11B, and 11C). In some embodiments, the encoded light signal may be received using a photo detector or an array of photo detectors (e.g., a CMOS image sensor and/or rolling shutter image sensor of a camera). In some embodiments, the encoded signal may be received across a plurality of image frames. The operation(s) at block 1305 may be performed and/or managed using the light signal receiver 312 described with reference to FIG. 3, 4, 5, and/or 6, and/or the image sensor 1250 described with reference to FIG. 12.

At block 1310, the method 1300 may include decoding the encoded light signal to obtain an identifier associated with the light fixture 105. The operation(s) at block 1310 may be performed and/or managed using the light signal receiver 312 described with reference to FIG. 3, 4, 5, and/or 6, and/or a receiver capability of the transceiver(s) 1230 described with reference to FIG. 12.

At block 1315, the method 1300 may include determining a correspondence between the identifier and a plurality of locations of the mobile device with respect to a location of each light fixture of the plurality of light fixtures. In some embodiments, some or all of the locations of light fixtures may be obtained from a database stored locally on (or remotely from) the mobile device 115. In some embodiments, some or all of the locations of light fixtures may be determined by the mobile device 115 (e.g., from the encoded light signals, sensor measurements, etc.). The operation(s) at block 1315 may be performed and/or managed using the light fixture commissioning controller 320 described with reference to FIG. 3, 4, 5, 6, and/or 12, and/or a device (e.g., a server and/or building automation system) located remotely from the mobile device 115.

In some cases, the method 1300 may be performed for each of a number of light fixtures (or all of the light fixtures) in the plurality of light fixtures. Therefore, the method 1300 may be used for commissioning light fixtures. It should be noted that the method 1300 is just one implementation and that the operations of the method 1300 may be rearranged or otherwise modified such that other implementations are possible.

Figure 14:
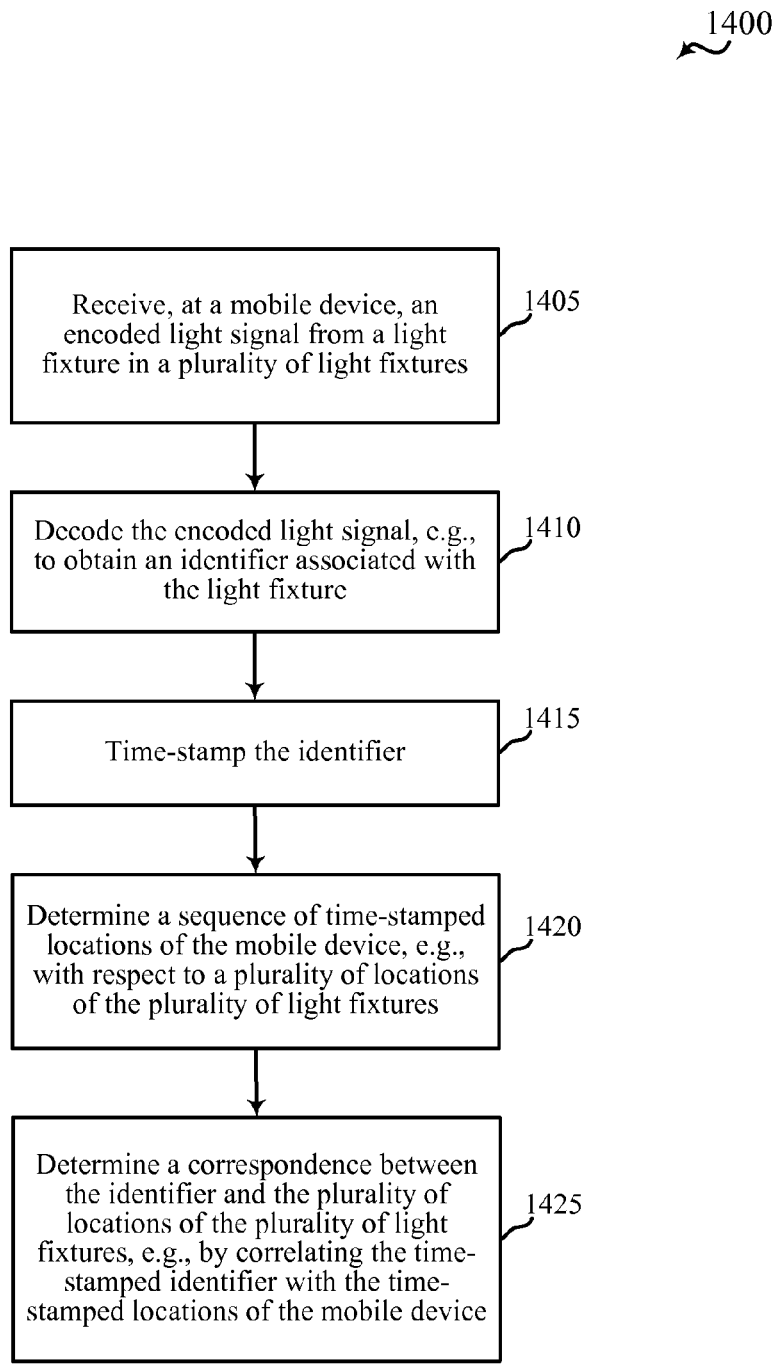
FIG. 14 is a flow chart illustrating another method for commissioning light fixtures, in accordance with certain example implementations.

FIG. 14 is a flow chart illustrating a method 1400 for commissioning or mapping light fixtures. For clarity, the method 1400 is described below with reference to aspects of one or more of the mobile devices 115 described with reference to FIG. 1, 3, 4, 5, and/or 12. In some examples, the light fixture commissioning controller 320 described with reference to FIG. 3, 4, 5, and/or 12 may execute one or more sets of codes to perform the functions described below.

At block 1405, the method 1400 may include receiving, at a mobile device 115, an encoded light signal from a light fixture in a plurality of light fixtures (e.g., from one of the light fixtures 105 described with reference to FIG. 1, 2, 8, 10, 11A, 11B, or 11C). In some embodiments, the encoded light signal may be received using a photo detector or an array of photo detectors (e.g., a CMOS image sensor and/or rolling shutter image sensor of a camera). In some embodiments, the encoded light signal may be received across a plurality of image frames. The operation(s) at block 1405 may be performed and/or managed using the light signal receiver 312 described with reference to FIG. 3, 4, and/or 5, and/or the image sensor 1250 described with reference to FIG. 12.

At block 1410, the method 1400 may include decoding the encoded light signal to obtain an identifier associated with the light fixture 105. The operation(s) at block 1410 may be performed and/or managed using the light signal receiver 312 described with reference to FIG. 3, 4, and/or 5, and/or a receiver capability of transceiver(s) 1230 described with reference to FIG. 12.

At block 1415, the method 1400 may include time-stamping the identifier. The operation(s) at block 1415 may be performed and/or managed using the light fixture commissioning controller 320 described with reference to FIG. 3, 4, 5, and/or 12, and/or the time-stamp unit 405 described with reference to FIG. 4 and/or 5.

At block 1420, the method 1400 may include determining a sequence of time-stamped locations of the mobile device 115 with respect to a plurality of locations of the plurality of light fixtures. In some embodiments, some or all of the locations of light fixtures may be obtained from a database stored locally on (or remotely from) the mobile device 115. In some embodiments, some or all of the locations of light fixtures may be determined by the mobile device 115 (e.g., from the encoded light signals, sensor measurements, etc.). In some cases, at least a first of the time-stamped locations may be determined based at least in part on a location of an external reference (e.g., a location of a wall, one or more of the light fixtures, a Wi-Fi access point, etc.). The operation(s) at block 1420 may be performed and/or managed using the light fixture commissioning controller 320 described with reference to FIG. 3, 4, 5, and/or 12, the device location determination unit 410 described with reference to FIG. 4 and/or 5, and/or a device (e.g., a server and/or building automation system) located remotely from the mobile device 115.

At block 1425, the method 1400 may include determining a correspondence between the identifier and locations of one or more light fixtures of the plurality of light fixtures by correlating the time-stamped identifier with the time-stamped locations of the mobile device. The operation(s) at block 1425 may be performed and/or managed using the light fixture commissioning controller 320 described with reference to FIG. 3, 4, 5, 6, and/or 12, the correlation unit 415 described with reference to FIG. 4 and/or 5, and/or a device (e.g., a server and/or building automation system) located remotely from the mobile device 115.

In some cases, the method 1400 may be performed for each of a number of light fixtures (or all of the light fixtures) in the plurality of light fixtures. Therefore, the method 1400 may be used for commissioning light fixtures. It should be noted that the method 1400 is just one implementation and that the operations of the method 1400 may be rearranged or otherwise modified such that other implementations are possible.

Figure 15:
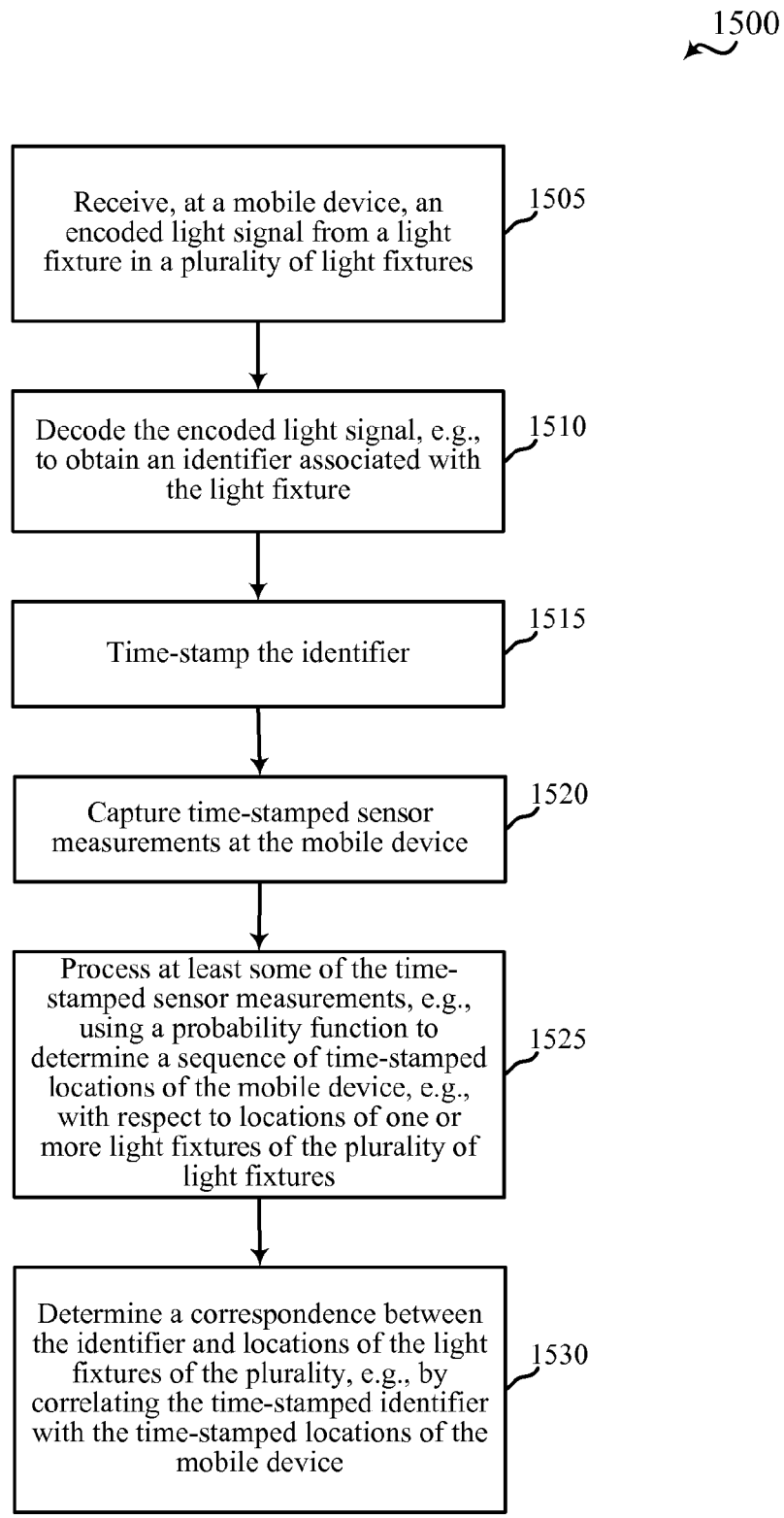
FIG. 15 is a flow chart illustrating another method for commissioning light fixtures, in accordance with certain example implementations.

FIG. 15 is a flow chart illustrating a method 1500 for commissioning or mapping light fixtures. For clarity, the method 1500 is described below with reference to aspects of one or more of the mobile devices 115 described with reference to FIG. 1, 3, 4, 5, and/or 12. In some examples, the light fixture commissioning controller 320 described with reference to FIG. 3, 4, 5, and/or 12 may execute one or more sets of codes to perform the functions described below.

At block 1505, the method 1500 may include receiving, at a mobile device 115, an encoded light signal from a light fixture in a plurality of light fixtures (e.g., from one of the light fixtures 105 described with reference to FIGS. 1, 2, 8, 10, 11A, 11B, and 11C). In some embodiments, the encoded light signal may be received using a photo detector or an array of photo detectors (e.g., a CMOS image sensor and/or rolling shutter image sensor of a camera). In some embodiments, the encoded signal may be received across a plurality of image frames. The operation(s) at block 1505 may be performed and/or managed using the light signal receiver 312 described with reference to FIG. 3, 4, and/or 5, and/or the image sensor 1250 described with reference to FIG. 12.

At block 1510, the method 1400 may include decoding the encoded light signal to obtain an identifier associated with the light fixture 105. The operation(s) at block 1510 may be performed and/or managed using the light signal receiver 312 described with reference to FIG. 3, 4, and/or 5, and/or a receiver capability of transceiver(s) 1230 described with reference to FIG. 12.

At block 1515, the method 1500 may include time-stamping the identifier. The operation(s) at block 1515 may be performed and/or managed using the light fixture commissioning controller 320 described with reference to FIG. 3, 4, 5, and/or 12, and/or the time-stamp unit 405 described with reference to FIG. 4 and/or 5.

At block 1520, the method 1500 may include acquiring time-stamped sensor measurements at the mobile device 115. In some examples, the measurements may include at least one of camera measurements, inertial measurements (e.g., gyroscope and/or accelerometer measurements), magnetic measurements, radio measurements (e.g., Wi-Fi signaling measurements such as RSSI and/or WWAN signaling measurements such as CIR), or a combination thereof. The operation(s) at block 1520 may be performed and/or managed using the receiver 310 described with reference to FIG. 3, 4, and/or 5, the sensor(s) 505 described with reference to FIG. 5, and/or the image sensor 1250 and/or one or more receiver capability of transceiver(s) 1230 described with reference to FIG. 12.

At block 1525, the method 1500 may include processing at least some of the time-stamped sensor measurements using a probability function to determine a sequence of time-stamped locations of the mobile device 115 with respect to locations of one or more light fixtures of the plurality of light fixtures. In some embodiments, some or all of the locations of light fixtures may be obtained from a database stored locally on (or remotely from) the mobile device 115. In some embodiments, some or all of the locations of light fixtures may be determined by the mobile device 115 (e.g., from the encoded light signals, sensor measurements, etc.). In some embodiments, the time-stamped measurements may be processed using a Bayesian interference model. The operation(s) at block 1525 may be performed and/or managed using the light fixture commissioning controller 320 described with reference to FIG. 3, 4, 5, and/or 12, the probability function processing unit 510 described with reference to FIG. 5, the device location determination unit 410 described with reference to FIG. 4 and/or 5, and/or a device (e.g., a server and/or building automation system) located remotely from the mobile device 115.

In some embodiments of the method 1500, determining the sequence of time-stamped locations of the mobile device 115 may include estimating at least one movement of the mobile device 115 (e.g., based on one or more of the time-stamped sensor measurements acquired at block 1520), and determining at least a second of the time-stamped locations in relation to at least a first of the time-stamped locations and the estimated movement of the mobile device 115. In some cases, at least a first of the time-stamped locations may be determined based at least in part on a location of an external reference (e.g., a location of a wall, one of the light fixtures, a Wi-Fi access point, etc.).

At block 1530, the method 1500 may include determining a correspondence between the time-stamped identifier and locations of one or more light fixtures of the plurality of light fixtures by correlating the time-stamped identifier with the time-stamped locations of the mobile device. The operation(s) at block 1530 may be performed and/or managed using the light fixture commissioning controller 320 described with reference to FIG. 3, 4, 5, 6, and/or 12, the probability function processing unit 510 described with reference to FIG. 5, and/or the correlation unit 415 described with reference to FIG. 4 and/or 5, and/or a device (e.g., a server and/or building automation system) located remotely from the mobile device 115.

In some cases, the method 1500 may be performed for each of a number of light fixtures (or all of the light fixtures) in the plurality of light fixtures. Therefore, the method 1500 may be used for commissioning light fixtures. It should be noted that the method 1500 is just one implementation and that the operations of the method 1500 may be rearranged or otherwise modified such that other implementations are possible.

Figure 16:
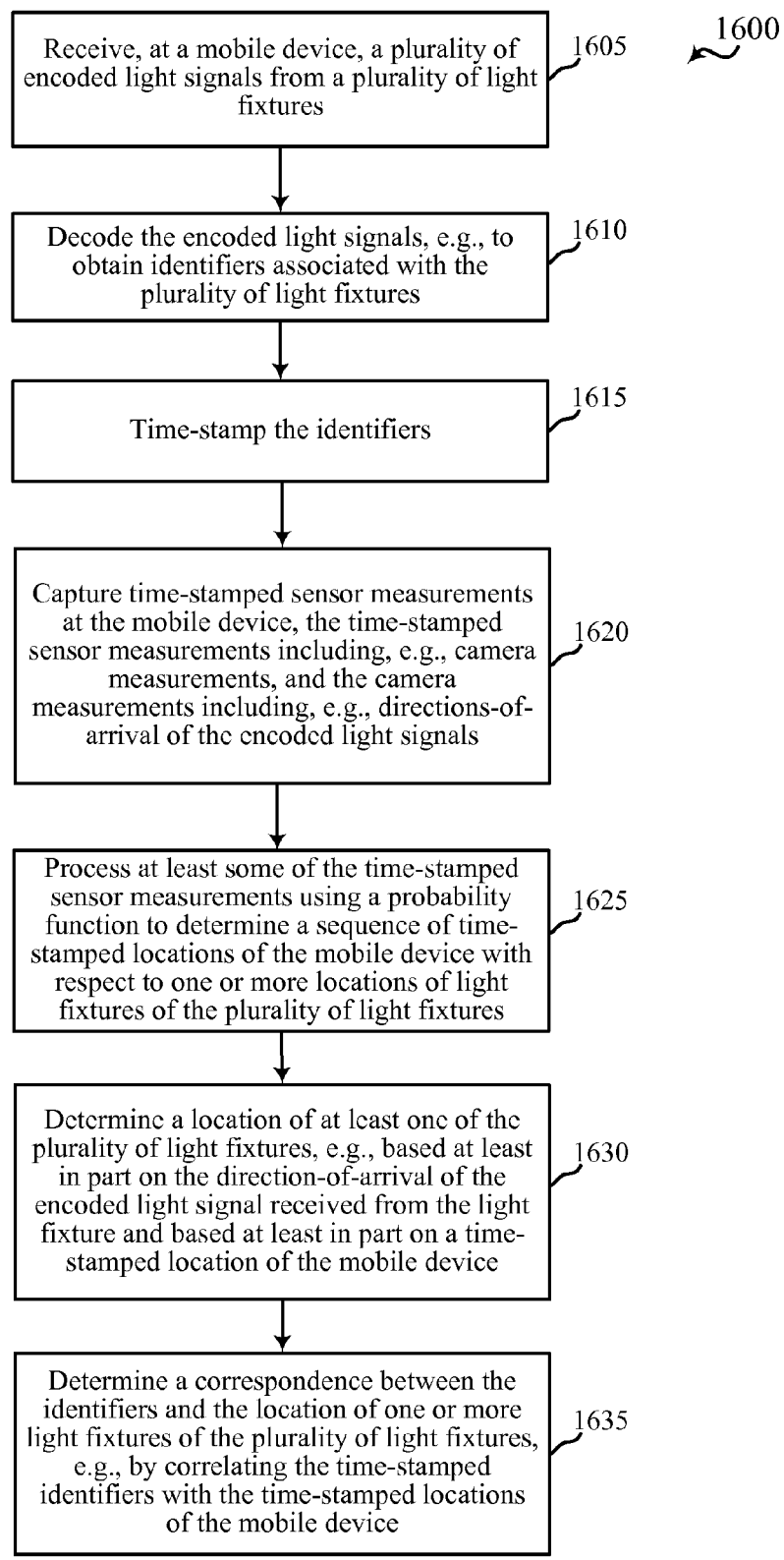
FIG. 16 is a flow chart illustrating another method for commissioning light fixtures, in accordance with certain example implementations.

FIG. 16 is a flow chart illustrating a method 1600 for commissioning or mapping light fixtures. For clarity, the method 1600 is described below with reference to aspects of one or more of the mobile devices 115 described with reference to FIG. 1, 3, 4, 5, and/or 12. In some examples, the light fixture commissioning controller 320 described with reference to FIG. 3, 4, 5, and/or 12 may execute one or more sets of codes to perform the functions described below.

At block 1605, the method 1600 may include receiving, at a mobile device 115, a plurality of encoded light signals from a plurality of light fixtures (e.g., from the light fixtures 105 described with reference to FIGS. 1, 2, 8, 10, 11A, 11B, and 11C). In some embodiments, the encoded signals may be received using a photo detector or an array of photo detectors (e.g., a CMOS image sensor and/or rolling shutter image sensor of a camera). In some embodiments, the encoded light signal may be received across a plurality of image frames. The operation(s) at block 1605 may be performed and/or managed using the light signal receiver 312 described with reference to FIG. 3, 4, and/or 5, and/or the image sensor 1250 described with reference to FIG. 12.

At block 1610, the method 1600 may include decoding the encoded light signals to obtain identifiers associated with the plurality of light fixtures 105. The operation(s) at block 1610 may be performed and/or managed using the light signal receiver 312 described with reference to FIG. 3, 4, and/or 5, and/or a receiver capability of transceiver(s) 1230 described with reference to FIG. 12.

At block 1615, the method 1600 may include time-stamping the identifiers. The operation(s) at block 1615 may be performed and/or managed using the light fixture commissioning controller 320 described with reference to FIG. 3, 4, 5, and/or 12, and/or the time-stamp unit 405 described with reference to FIG. 4 and/or 5.

At block 1620, the method 1600 may include acquiring time-stamped sensor measurements at the mobile device 115. In some examples, the measurements may include at least one of camera measurements, inertial measurements (e.g., gyroscope and/or accelerometer measurements), magnetic measurements, radio measurements (e.g., Wi-Fi signaling measurements such as RSSI and/or WWAN signaling measurements such as CIR), or a combination thereof. The camera measurements may include directions-of-arrival of the encoded light signals. The operation(s) at block 1620 may be performed and/or managed using the receiver 310 described with reference to FIG. 3, 4, and/or 5, the sensor(s) 505 described with reference to FIG. 5, and/or the image sensor 1250 and/or one or more receiver capabilities of transceiver(s) 1230 described with reference to FIG. 12.

At block 1625, the method 1600 may include processing at least some of the time-stamped sensor measurements using a probability function to determine a sequence of time-stamped locations of the mobile device 115 with respect to locations of one or more light fixtures of the plurality of light fixtures. In some embodiments, some or all of the locations of light fixtures may be obtained from a database stored locally on (or remotely from) the mobile device 115. In some embodiments, some or all of the locations of light fixtures may be determined by the mobile device 115 (e.g., from the encoded light signals, sensor measurements, etc.). In some embodiments, the time-stamped measurements may be processed using a Bayesian interference model. The operation(s) at block 1625 may be performed and/or managed using the light fixture commissioning controller 320 described with reference to FIG. 3, 4, 5, and/or 12, the probability function processing unit 510 described with reference to FIG. 5, the device location determination unit 410 described with reference to FIG. 4 and/or 5, and/or a device (e.g., a server and/or building automation system) located remotely from the mobile device 115.

In some embodiments of the method 1600, determining the sequence of time-stamped locations of the mobile device 115 may include estimating at least one movement of the mobile device 115 (e.g., based on one or more of the time-stamped sensor measurements acquired at block 1620), and determining at least a second of the time-stamped locations in relation to at least a first of the time-stamped locations and the estimated movement of the mobile device 115. In some cases, at least a first of the time-stamped locations may be determined based at least in part on a location of an external reference (e.g., a location of a wall, one of the light fixtures, a Wi-Fi access point, etc.).

At block 1630, the method 1600 may include determining a location of at least one of the plurality of light fixtures. In some embodiments, the location of a light fixture may be determined based at least in part on the direction-of-arrival of the encoded light signal received from the light fixture (or the directions-of-arrival of encoded signals received from multiple light fixtures) and based at least in part on the sequence of time-stamped locations of the mobile device 115. In some embodiments, the location of at least two light fixtures in the plurality of light fixtures may be determined based at least in part on the directions-of-arrival of the encoded light signals received from the at least two light fixtures (or the directions-of-arrival of additional encoded signals received from additional light fixtures) and based at least in part on the sequence of time-stamped locations of the mobile device 115. The operation(s) at block 1630 may be performed and/or managed using the light fixture commissioning controller 320 described with reference to FIG. 3, 4, 5, 6, and/or 12, the light fixture location determination unit 515 described with reference to FIG. 5, and/or a device (e.g., a server and/or building automation system) located remotely from the mobile device 115.

At block 1635, the method 1600 may include determining a correspondence between the time-stamped identifiers and the location of one or more light fixtures of the plurality of light fixtures by correlating the time-stamped identifiers with the time-stamped locations of the mobile device. The operation(s) at block 1635 may be performed and/or managed using the light fixture commissioning controller 320 described with reference to FIG. 3, 4, 5, 6, and/or 12, the probability function processing unit 510 described with reference to FIG. 5, the correlation unit 415 described with reference to FIG. 4 and/or 5, and/or a device (e.g., a server and/or building automation system) located remotely from the mobile device 115.

In some embodiments of the method 1600, the operation(s) at block 1635 may include determining a correspondence between at least two identifiers having a common time-stamp and the plurality of locations of the plurality of light fixtures based at least in part on directions-of-arrival of the encoded light signals from which the at least two identifiers having the common time stamp are decoded.

Therefore, the method 1600 may be used for commissioning light fixtures. It should be noted that the method 1600 is just one implementation and that the operations of the method 1600 may be rearranged or otherwise modified such that other implementations are possible.

Figure 17:
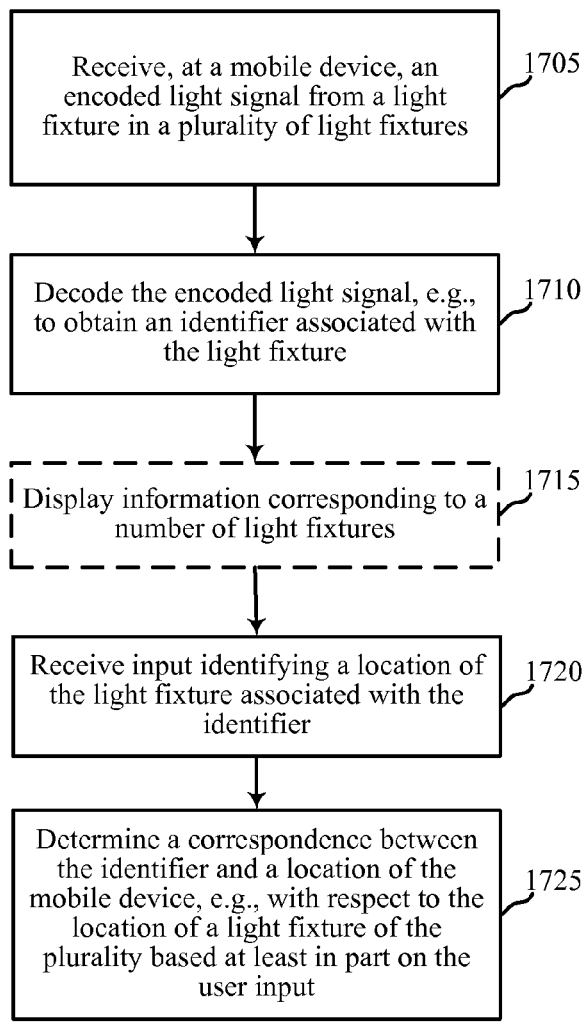
FIG. 17 is a flow chart illustrating another method for commissioning light fixtures, in accordance with certain example implementations.

FIG. 17 is a flow chart illustrating a method 1700 for commissioning light fixtures. For clarity, the method 1700 is described below with reference to aspects of one or more of the mobile devices 115 described with reference to FIG. 1, 3, 6, and/or 12. In some examples, the light fixture commissioning controller 320 described with reference to FIG. 3, 6, and/or 12 may execute one or more sets of codes to perform the functions described below.

At block 1705, the method 1700 may include receiving, at a mobile device 115, an encoded signal from a light fixture in a plurality of light fixtures (e.g., from one of the light fixtures 105 described with reference to FIGS. 1, 2, 8, 10, 11A, 11B, and 11C). In some embodiments, the encoded light signal may be received using a photo detector or an array of photo detectors (e.g., a CMOS image sensor and/or rolling shutter image sensor of a camera). In some embodiments, the encoded light signal may be received across a plurality of image frames. The operation(s) at block 1705 may be performed and/or managed using the light signal receiver 312 described with reference to FIG. 3 and/or 6, and/or the image sensor 1250 described with reference to FIG. 12.

At block 1710, the method 1700 may include decoding the encoded light signal to obtain an identifier associated with the light fixture 105. The operation(s) at block 1710 may be performed and/or managed using the light signal receiver 312 described with reference to FIG. 3 and/or 6, and/or a receiver capability of transceiver(s) 1230 described with reference to FIG. 12.

At block 1715, the method 1700 may optionally include displaying information corresponding to a number of light fixtures. The information may correspond to each of the plurality of light fixtures or just some of the plurality of light fixtures. In some embodiments, the displayed information may include a map of the number of light fixtures (as well as locations of walls and other elements of a building floor plan). In some embodiments, the displayed information may include locations of the number of light fixtures (e.g., as coordinates and/or locations on a map). In some embodiments, the information may be obtained from a database stored locally on (or remotely from) the mobile device 115. In other embodiments, the information may be determined by the mobile device 115 (e.g., from the encoded light signals, sensor measurements, etc.). The operation(s) at block 1715 may be performed and/or managed using the light fixture commissioning controller 320 described with reference to FIG. 3, 6, and/or 12, and/or the interface function 605 described with reference to FIG. 6.

At block 1720, the method 1700 may include receiving input identifying a location of the light fixture associated with the identifier. In some embodiments, the input may include a selection from the information corresponding to the number of light fixtures, such as a graphical selection (e.g., via a touchscreen) of the light fixture or a selection of the light fixture from a list of light fixtures (or list of coordinates of locations of light fixtures). In some embodiments, the input may include information that is manually input into (e.g., typed into) the mobile device 115. The operation(s) at block 1720 may be performed and/or managed using the light fixture commissioning controller 320 described with reference to FIG. 3, 6, and/or 12, and/or the input processing function 610 described with reference to FIG. 6.

At block 1725, the method 1700 may include determining a correspondence between the identifier and a location of the mobile device with respect to the location of a light fixture of the plurality of light fixtures. In some embodiments, the correspondence may be determined based on the input received at block 1720. The operation(s) at block 1725 may be performed and/or managed using the light fixture commissioning controller 320 described with reference to FIG. 3, 6, and/or 12, and/or a device (e.g., a server and/or building automation system) located remotely from the mobile device 115.

In some cases, the method 1700 may be performed for each of a number of light fixtures (or all of the light fixtures) in the plurality of light fixtures. Therefore, the method 1700 may be used for commissioning light fixtures. It should be noted that the method 1700 is just one implementation and that the operations of the method 1700 may be rearranged or otherwise modified such that other implementations are possible.

In some examples, operations of the methods 1300, 1400, 1500, 1600, and/or 1700 described with reference to FIG. 13, 14, 15, 16, and/or 17 may be combined.

Figure 18:
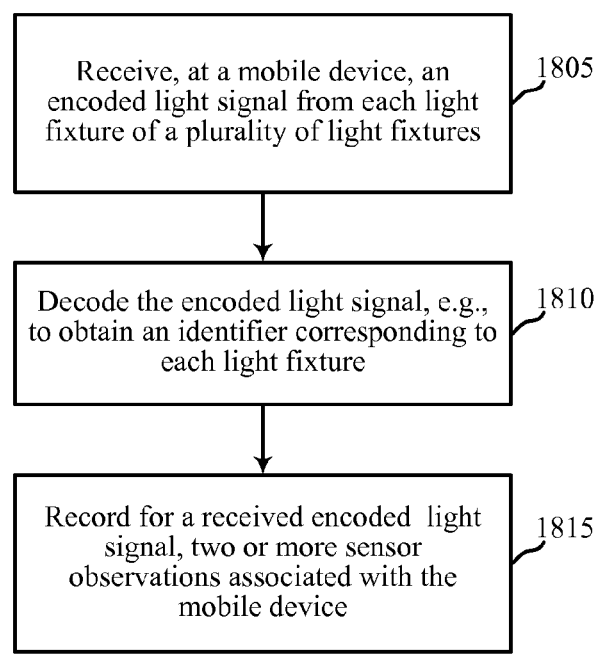
FIG. 18 is a flow chart illustrating a method for mapping light fixtures, in accordance with certain example implementations.

FIG. 18 is a flow chart illustrating a method 1800 for commissioning or mapping light fixtures. For clarity, method 1800 is described below with reference to aspects of one or more of the mobile devices described with reference to FIGS. 1, 3, 4, 5, 6, 11B, 11C, and/or 12. In some examples, the light fixture commissioning controller 320 and/or a similar light fixture mapping capability described with reference to FIGS. 3, 4, 5, 6, and/or 12 may execute one or more sets of codes to perform the functions described below.

At block 1805, method 1800 may include receiving, at a mobile device, an encoded light signal from each light fixture of a plurality of light fixtures (e.g., a plurality from the numerous light fixtures 1110 described with reference to FIGS. 11B-11C). In some embodiments, the encoded light signal may be received using a photo detector or an array of photo detectors (e.g., a CMOS image sensor and/or rolling shutter image sensor of a camera). In some embodiments, the encoded light signal may be received across a plurality of image frames. At block 1810, method 1800 may include decoding each received encoded signal to obtain an identifier corresponding to each light fixture 1110.

At block 1815, method 1800 may include recording, when each encoded light signal is received, two or more sensor observations associated with the mobile device. In some embodiments, at least one sensor observation of the two or more sensor observations associated with the mobile device may comprise an image 1115 corresponding to one or more light fixtures of the plurality of light fixtures. Additionally or alternatively, at least one sensor observation of the two or more sensor observations associated with the mobile device may comprise an inertial measurement 1125 of the mobile device. Other example sensor observations are contemplated including, but not limited to, embodiments in which at least one sensor observation of the two or more sensor observations associated with the mobile device comprises a location-based measurement of the mobile device.

Figure 19:
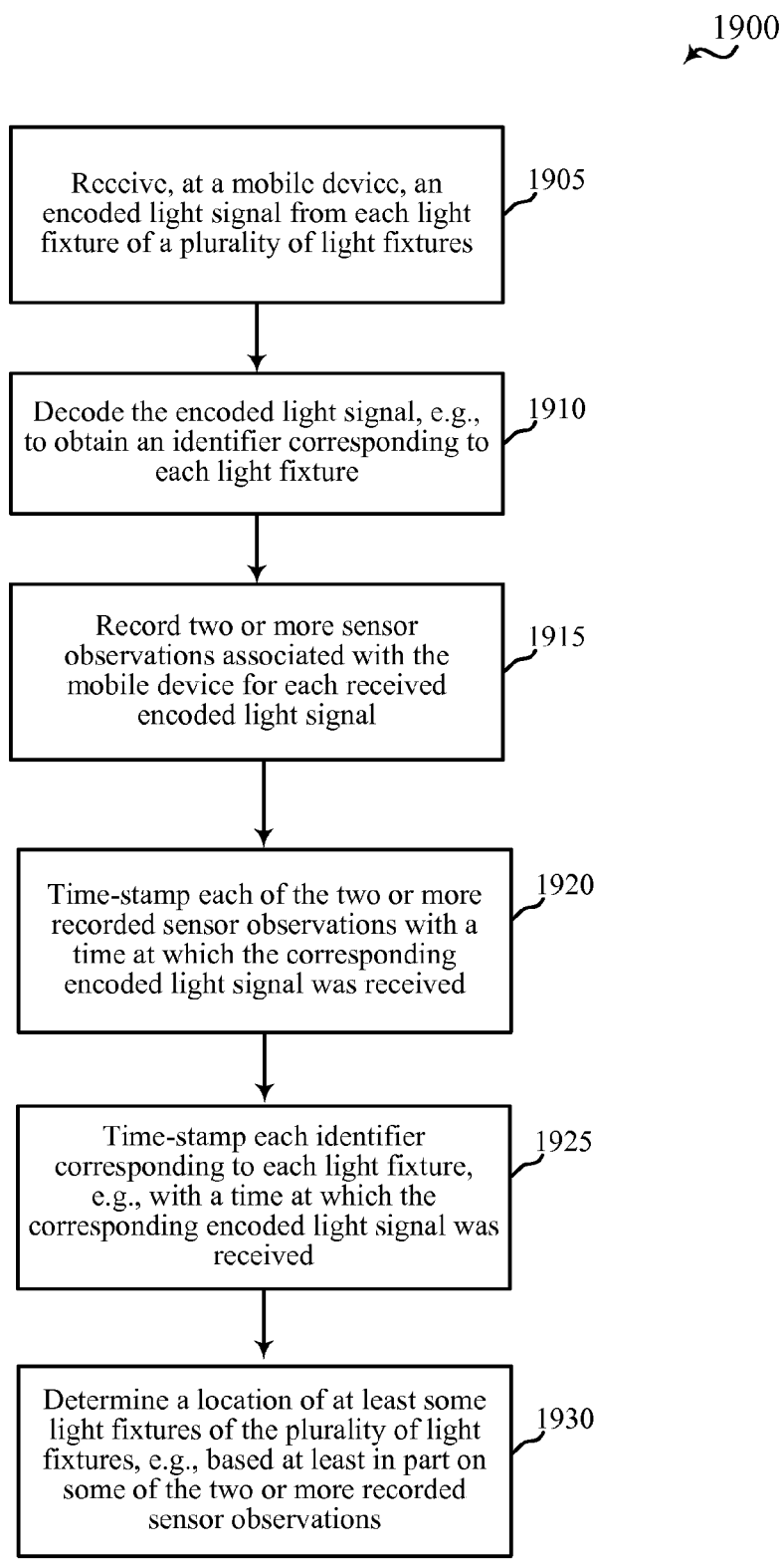
FIG. 19 is a flow chart illustrating another method for mapping light fixtures, in accordance with certain example implementations.

FIG. 19 is a flow chart illustrating a method 1900 for commissioning or mapping light fixtures. For clarity, method 1900 is described below with reference to aspects of one or more of the mobile devices described with reference to FIG. 1, 3, 4, 5, 6, 11B, 11C, and/or 12. In some examples, the light fixture commissioning controller 320 and/or a similar light fixture mapping capability described with reference to FIG. 3, 4, 5, 6, and/or 12 may execute one or more sets of codes to perform the functions described below.

At block 1905, method 1900 may include receiving, at a mobile device, an encoded light signal from each light fixture of a plurality of light fixtures (e.g., a plurality from the numerous light fixtures 1110 described with reference to FIGS. 11B-11C). In some embodiments, the encoded light signal may be received using a photo detector or an array of photo detectors (e.g., a CMOS image sensor and/or rolling shutter image sensor of a camera). In some embodiments, the encoded light signal may be received across a plurality of image frames. In some cases, receiving, at the mobile device, each encoded signal from each light fixture of the plurality of light fixtures may comprise receiving each encoded signal along a trajectory comprising a plurality of positions of the mobile device. The trajectory may be linear in some implementations. At block 1910, method 1900 may include decoding each received encoded light signal to obtain an identifier corresponding to each light fixture 1110.

At block 1915, method 1900 may include recording, when each encoded light signal is received, two or more sensor observations associated with the mobile device. At block 1920, method 1900 may include time-stamping each of the two or more recorded sensor observations with a time at which the corresponding encoded signal was received. In this regard, information regarding poses 1120 of the mobile device and images 1115 captured by the mobile device at multiple points in time can be ascertained and compared with other information received by the mobile device (e.g., identifiers corresponding to particular light fixtures 1110). At block 1925, method 1900 may include time-stamping each identifier corresponding to each light fixture with a time at which the corresponding encoded light signal was received.

At block 1930, method 1900 may include determining a location of at least some light fixtures of the plurality of light fixtures based at least in part on some of the two or more recorded sensor observations. For example, received identifiers decoded from the corresponding encoded signal may identify at least some light fixtures of the plurality of light fixtures. The location of these identified light fixtures 1110 may be determined by using the sensor observations that temporally correspond to the received identifiers.

In some embodiments, determining the location of at least some light fixtures of the plurality of light fixtures 1110 may comprise identifying a set of a plurality of the two or more recorded sensor observations in which a time stamp for the two or more recorded sensor observations is equal to or substantially the same as time stamps associated with at least two identifiers (e.g., image 1115-$b$ may include illuminated light fixture features of light fixture 1110-$a$ and light fixture 1110-$b$, along with inertial measurement 1125-$b$; image 1115-$d$ may include illuminated light fixture features of light fixture 1110-$b$ and light fixture 1110-$c$, along with inertial measurement 1125-$d$; and image 1115-$f$ may include illuminated light fixture features of light fixture 1110-$c$ and light fixture 1110-$d$, along with inertial measurement 1125-$f$). In some implementations, time stamps that differ between 0.001 and 1.000 seconds may be deemed to be substantially the same. Determining the location of at least some light fixtures of the plurality of light fixtures 1110 may also comprise utilizing the set of the plurality of the two or more recorded sensor observations for determining the location of the at least some light fixtures 1110 of the plurality of light fixtures.

In some cases, utilizing the set of the plurality of the two or more recorded sensor observations for determining the location of the at least some light fixtures of the plurality of light fixtures may comprises processing the set of the plurality of the two or more recorded sensor observations using a pairwise constraint approach, as illustrated and described throughout the disclosure.

Techniques described herein may be used to determine the orientations of mobile devices operating in various wireless communication systems, such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks described in connection with the disclosure herein may, individually or collectively, be implemented or performed with one or more application-specific integrated circuits (ASICs) adapted to perform some or all of the applicable functions in hardware. Alternatively, the functions may be performed by one or more other processing units (or cores) such as a general-purpose processor or a digital signal processor (DSP), and/or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each of the blocks may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method for mapping light fixtures at a mobile device, comprising:
    receiving a first encoded light signal from a first light fixture and a second encoded light signal from a second light fixture;
    decoding the first and second encoded light signals to obtain respective identifiers associated with the first and second light fixtures;
    time-stamping each of the respective identifiers with a common time-stamp;
    acquiring time-stamped sensor measurements, each time-stamped sensor measurement comprising a respective first direction-of-arrival of the first encoded light signal and a respective second direction-of-arrival of the second encoded light signal;
    processing at least some of the time-stamped sensor measurements using a probability function to determine a sequence of time-stamped locations of the mobile device, each time-stamped location of the sequence of time-stamped locations determined with respect to a location of the first light fixture and a location of the second light fixture; and
    determining, based at least in part on the respective first and second directions-of-arrival, a correspondence between the respective identifiers having the common time-stamp and each time-stamped location of the sequence of time-stamped locations of the mobile device.

2. The method of claim 1, wherein determining the correspondence between the respective identifiers having the common time-stamp and each time-stamped location of the sequence of time-stamped locations comprises:
    correlating each time-stamped identifier with each time-stamped location.

3. The method of claim 1, further comprising:
    determining a location of the first light fixture based at least in part on the direction-of-arrival of the first encoded light signal received from the first light fixture and based at least in part on the sequence of time-stamped locations of the mobile device.

4. The method of claim 1, further comprising:
    determining locations of the first and second light fixtures based at least in part on the respective directions-of-arrival of the first and second encoded light signals received from the first and second light fixtures and based at least in part on the sequence of time-stamped locations of the mobile device.

5. The method of claim 1, wherein processing the at least some of the time-stamped sensor measurements using the probability function comprises:
    processing the at least some of the time-stamped sensor measurements using a Bayesian interference model.

6. The method of claim 1, wherein acquiring the time-stamped sensor measurements comprises:
    acquiring at least one of camera measurements, inertial measurements, magnetic measurements, radio measurements, or a combination thereof.

7. The method of claim 1, wherein determining the sequence of time-stamped locations of the mobile device comprises:
    estimating at least one movement of the mobile device; and
    determining at least a second of the sequence of time-stamped locations in relation to at least a first of the sequence of time-stamped locations and the at least one estimated movement of the mobile device.

8. The method of claim 7, further comprising:
    determining at least a first of the sequence of time-stamped locations based at least in part on a location of an external reference.

9. The method of claim 1, further comprising:
    receiving input identifying a location of the first light fixture associated with the first identifier.

10. The method of claim 9, further comprising:
    displaying information corresponding to a number of light fixtures comprising the first and second light fixtures; and
    receiving a selection from the information corresponding to the number of light fixtures.

11. The method of claim 10, wherein displaying the information comprises:
    displaying a map of the number of light fixtures.

12. The method of claim 1, wherein receiving the first encoded light signal at the mobile device comprises:
    receiving the first encoded light signal using a rolling shutter image sensor of the mobile device.

13. The method of claim 1, wherein at least one of the first light fixture or the second light fixture is arranged within an indoor environment.

14. A mobile device for mapping light fixtures, comprising:
- means for receiving a first encoded light signal from a first light fixture and a second encoded light signal from a second light fixture;
- means for decoding the first and second encoded light signals to obtain respective identifiers associated with the first and second light fixtures;
- means for time-stamping each of the respective identifiers with a common time-stamp;
- means for acquiring time-stamped sensor measurements, each time-stamped sensor measurement comprising a respective first direction-of-arrival of the first encoded light signal and a respective second direction-of-arrival of the second encoded light signal;
- means for processing at least some of the time-stamped sensor measurements using a probability function to determine a sequence of time-stamped locations of the mobile device, each time-stamped location of the sequence of time-stamped locations determined with respect to a location of the first light fixture and a location of the second light fixture; and
- means for determining, based at least in part on the respective first and second directions-of-arrival, a correspondence between the respective identifiers having the common time-stamp and each time-stamped location of the sequence of time-stamped locations of the mobile device.

15. A mobile device for mapping light fixtures, comprising:
- a processor;
- memory in electronic communication with the processor; and
- instructions stored in the memory, the instructions being executable by the processor to:
  - receive a first encoded light signal from a first light fixture and a second encoded light signal from a second light fixture;
  - decode the first and second encoded light signals to obtain respective identifiers associated with the first and second light fixtures;
  - time-stamp each of the respective identifiers with a common time-stamp;
  - acquire time-stamped sensor measurements, each time-stamped sensor measurement comprising a respective first direction-of-arrival of the first encoded light signal and a respective second direction-of-arrival of the second encoded light signal;
  - process at least some of the time-stamped sensor measurements using a probability function to determine a sequence of time-stamped locations of the mobile device, each time-stamped location of the sequence of time-stamped locations determined with respect to a location of the first light fixture and a location of the second light fixture; and
  - determine, based at least in part on the respective first and second directions-of-arrival, a correspondence between the respective identifiers having the common time-stamp and each time-stamped location of the sequence of time-stamped locations of the mobile device.

16. The mobile device of claim 15, wherein the instructions executable by the processor to determine the correspondence between the respective identifiers having the common time-stamp and each time-stamped location of the sequence of time-stamped locations comprise instructions executable by the processor to:
- correlate each time-stamped identifier with each time-stamped location.

17. The mobile device of claim 15, wherein the instructions are executable by the processor to:
- determine a location of the first light fixture based at least in part on the direction-of-arrival of the first encoded light signal received from the first light fixture and based at least in part on the sequence of time-stamped locations of the mobile device.

18. The mobile device of claim 15, wherein the instructions are executable by the processor to:
- determine locations of the first and second light fixtures based at least in part on the respective directions-of-arrival of the first and second encoded light signals received from the first and second light fixtures and based at least in part on the sequence of time-stamped locations of the mobile device.

19. The mobile device of claim 15, wherein the instructions executable by the processor to acquire the time-stamped sensor measurements comprise instructions executable by the processor to:
- acquire at least one of camera measurements, inertial measurements, magnetic measurements, radio measurements, or a combination thereof.

20. A non-transitory computer-readable medium storing computer-executable code for mapping light fixtures, the code executable by a processor to:
- receive a first encoded light signal from a first light fixture and a second encoded light signal from a second light fixture;
- decode the first and second encoded light signals to obtain respective identifiers associated with the first and second light fixtures;
- time-stamp each of the respective identifiers with a common time-stamp;
- acquire time-stamped sensor measurements, each time-stamped sensor measurement comprising a respective first direction-of-arrival of the first encoded light signal and a respective second direction-of-arrival of the second encoded light signal;
- process at least some of the time-stamped sensor measurements using a probability function to determine a sequence of time-stamped locations of the mobile device, each time-stamped location of the sequence of time-stamped locations determined with respect to a location of the first light fixture and a location of the second light fixture; and
- determine, based at least in part on the respective first and second directions-of-arrival, a correspondence between the respective identifiers having the common time-stamp and each time-stamped location of the sequence of time-stamped locations of the mobile device.

* * * * *